(12) United States Patent
Silverbrook

(10) Patent No.: US 7,232,203 B2
(45) Date of Patent: *Jun. 19, 2007

(54) LIQUID-EJECTION INTEGRATED CIRCUIT DEVICE THAT INCORPORATES A NOZZLE GUARD WITH CONTAINMENT STRUCTURES

(75) Inventor: Kia Silverbrook, Balmain (AU)

(73) Assignee: Silverbrook Research Pty Ltd, Balmain, NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/329,088

(22) Filed: Jan. 11, 2006

(65) Prior Publication Data

US 2006/0109299 A1    May 25, 2006

Related U.S. Application Data

(63) Continuation of application No. 11/026,117, filed on Jun. 3, 2005, now Pat. No. 6,991,321, which is a continuation of application No. 10/778,088, filed on Feb. 17, 2004, now Pat. No. 6,921,154, which is a continuation of application No. 10/052,449, filed on Jan. 23, 2002, now Pat. No. 6,733,684.

(30) Foreign Application Priority Data

Feb. 6, 2001 (AU) ..................... PR2923

(51) Int. Cl.
B41J 2/015 (2006.01)
B41J 2/14 (2006.01)

(52) U.S. Cl. .............. 347/20; 347/47; 347/50

(58) Field of Classification Search ............... 347/54, 347/20, 47, 50, 67–72; 216/27; 29/890.1
See application file for complete search history.

(56) References Cited

U.S. PATENT DOCUMENTS

| 4,450,455 A | 5/1984 | Sugitani et al. |
| 4,736,212 A | 4/1988 | Oda et al. |
| 4,937,676 A | 6/1990 | Finelli et al. |
| 4,975,718 A | 12/1990 | Akami et al. |
| 5,057,853 A | 10/1991 | Fisher |
| 5,398,131 A | 3/1995 | Hall et al. |
| 5,929,877 A | 7/1999 | Hetzer et al. |
| 6,139,761 A | 10/2000 | Ohkuma |
| 6,328,417 B1 | 12/2001 | Silverbrook |
| 6,341,842 B1 | 1/2002 | Beach et al. |
| 6,412,908 B2 | 7/2002 | Silverbrook |
| 6,439,693 B1 | 8/2002 | Silverbrook |

(Continued)

FOREIGN PATENT DOCUMENTS

DE     3523428 A1    1/1987

(Continued)

*Primary Examiner*—Shih-Wen Hsieh

(57) ABSTRACT

A liquid-ejection integrated circuit includes a substrate that defines a plurality of liquid inlet channels. A plurality of nozzle chamber structures is positioned on the substrate and defines nozzle chambers in fluid communication with respective liquid inlet channels. Each nozzle chamber structure incorporates a liquid ejection member. A nozzle guard is positioned on the substrate. A plurality of containment walls is interposed between the substrate and the nozzle guard to define a plurality of containment chambers. The nozzle guard, the containment walls and the substrate are of materials that have the same coefficient of thermal expansion.

7 Claims, 31 Drawing Sheets

U.S. PATENT DOCUMENTS

| | | | |
|---|---|---|---|
| 6,505,913 B2 * | 1/2003 | Silverbrook | 347/54 |
| 6,733,684 B2 | 5/2004 | Silverbrook | |
| 6,921,154 B2 | 7/2005 | Silverbrook | |
| 6,991,321 B2 * | 1/2006 | Silverbrook | 347/54 |
| 2002/0000516 A1 | 1/2002 | Schultz et al. | |
| 2004/0159632 A1 | 8/2004 | Silverbrook | |

FOREIGN PATENT DOCUMENTS

| | | |
|---|---|---|
| DE | 19901264 A1 | 7/2000 |
| EP | 0382044 A2 | 8/1990 |
| EP | 0398295 A2 | 11/1990 |
| EP | 763930 A1 | 3/1997 |
| JP | 2001-130009 A | 5/2001 |
| WO | WO 95/16323 | 6/1995 |
| WO | WO 96/32265 A | 10/1996 |
| WO | WO 97/06958 A | 2/1997 |
| WO | WO 00/23279 A1 | 4/2000 |

* cited by examiner

LIQUID-EJECTION INTEGRATED CIRCUIT DEVICE THAT INCORPORATES A NOZZLE GUARD WITH CONTAINMENT STRUCTURES

CROSS REFERENCES TO RELATED APPLICATIONS

This application is a continuation of U.S. application Ser. No. filed on Jan. 3, 2005, now issued U.S. Pat. No. 6,991,321, which is a continuation of U.S. application Ser. No. 10/778,088 filed Feb. 17, 2004, now issued U.S. Pat. No. 6,921,154, which is a continuation of U.S. application Ser. No. 10/052,449 filed Jan. 23, 2002, now issued Pat. No. 6,733,684, all of which are herein incorporated by reference.

FIELD OF THE INVENTION

The present invention relates to printheads. More particularly, the present invention relates to a printhead that incorporates a nozzle guard and an alignment mechanism for the nozzle guard.

BACKGROUND TO THE INVENTION

Ink jet printers are a well-known and widely used form of printed media production. Ink is fed to an array of digitally controlled nozzles on a printhead. As the print head passes over the media, ink is ejected from the array of nozzles to produce an image on the media.

Printer performance depends on factors such as operating cost, print quality, operating speed and ease of use. The mass, frequency and velocity of individual ink drops ejected from the nozzles will affect these performance parameters.

Recently, the array of nozzles has been formed using micro-electromechanical systems (MEMS) technology, which have mechanical structures with sub-micron thicknesses. This allows the production of printheads that can rapidly eject ink droplets sized in the picoliter ($\times 10^{-12}$ liter) range.

While the microscopic structures of these printheads can provide high speeds and good print quality at relatively low costs, their size makes the nozzles extremely fragile and vulnerable to damage from the slightest contact with fingers, dust or the media substrate. This can make the printheads impractical for many applications where a certain level of robustness is necessary. Furthermore, a damaged nozzle may fail to eject the ink being fed to it. As ink builds up and beads on the exterior of the nozzle, the ejection of ink from surrounding nozzle may be affected and/or the damaged nozzle will simply leak ink onto the printed substrate. Both situations are detrimental to print quality.

To address this, an apertured guard may be fitted over the nozzles to shield them against damaging contact. Ink ejected from the nozzles passes through the apertures on to the paper or other substrate to be printed. However, to effectively protect the nozzles, the apertures need to be as small as possible to maximize the restriction against the ingress of foreign matter while still allowing the passage of the ink droplets. Preferably, each nozzle would eject ink through its own individual aperture in the guard. However, given the microscopic scale of MEMS devices, slight misalignments between the guard and the nozzles will obstruct the path of the ink droplets. Providing alignment formations on the silicon wafer substrate for engaging complementary formations on the guard can align the nozzles and respective apertures to within 0.1 µm. However, while attaching the guard to the substrate, movement of the complementary formations into engagement with the alignment formations can damage the delicate nozzle structures.

SUMMARY OF THE INVENTION

According to a first aspect of the invention, there is provided a printhead that comprises a substrate that defines a plurality of ink inlet conduits;

a plurality of nozzle assemblies that are positioned on the substrate, each nozzle assembly defining a nozzle chamber in fluid communication with a respective ink inlet conduit and a nozzle opening from which ink is ejected;

a plurality of alignment formations that are positioned on the substrate to extend from the substrate;

a guard member that is positioned on the substrate and spaced from the nozzle assemblies, the guard member defining a plurality of apertures that correspond with respective nozzle openings; and a plurality of struts that are positioned on the guard member and are engageable with respective alignment formations, the struts and the alignment formations being positioned so that, when each strut engages an alignment formation, the apertures are aligned with respective nozzle openings.

A plurality of containment walls may be disposed about respective nozzle assemblies and interposed between the substrate and the guard member to define a plurality of containment chambers, at least one nozzle assembly being positioned in a respective containment chamber.

One nozzle assembly may be positioned in each containment chamber.

The substrate may incorporate drive circuitry and each nozzle assembly may include a micro-electromechanical ink ejection mechanism that is connected to the drive circuitry to eject ink from the nozzle chamber on receipt of a signal from the drive circuitry.

Each micro-electromechanical ink ejection mechanism may include a thermal bend actuator that is connected to the drive circuitry to be deflected as a result of differential thermal expansion and contraction on receipt of an electrical signal from the drive circuitry. An ink displacement member may be connected to the thermal bend actuator. The ink displacement member may be operatively arranged with respect to the nozzle chamber so that deflection of the thermal bend actuator results in the ejection of ink from the nozzle chamber.

Each ink displacement member may define part of the nozzle chamber such that movement of the ink displacement member under action of the thermal bend actuator results in a change in volume of the nozzle chamber and subsequent ejection of ink from the nozzle chamber.

The substrate and the guard member may be of materials that have the same coefficient of thermal expansion.

A seal may be interposed between each strut and its associated alignment formation.

According to a second aspect of the invention there is provided a method of fabricating a printhead for an ink jet printer, the printhead including:

a substrate carrying an array of nozzles for ejecting ink onto media to be printed; and an apertured nozzle guard to inhibit damaging contact with the nozzles, the method comprising the steps of:

forming the nozzles on the substrate using material etching and deposition techniques such that the nozzles are reinforced by sacrificial material;

positioning the apertured nozzle guard over the exterior of the nozzles such that its apertures are in close registration with the nozzles; and subsequently, etching away the sacrificial material reinforcing the nozzles.

In this specification the term "nozzle" is to be understood as an element defining an opening and not the opening itself.

In a preferred embodiment, alignment formations are formed on the substrate, the alignment formations being configured for engagement with complementary formations on the apertured nozzle guard; wherein, engagement between the alignment formations and the complementary formations holds the apertures in close registration with the nozzles such that the guard does not obstruct the normal trajectory of ink ejected from the nozzles onto the media.

Preferably, etching plasma is injected through one or more of the apertures in the nozzle guard to release the sacrificial material protecting the nozzles, the released sacrificial material and etching plasma flushing out through the apertures in the nozzle guard.

In one embodiment, the etching plasma is oxygen plasma and the sacrificial material is polyimide. In this embodiment, it is desirable to provide an inorganic seal between the alignment formation and the complementary formation.

The substrate may be a silicon wafer. The nozzle guard may have a shield containing the apertures, the shield being spaced from the silicon substrate by integrally formed struts extending from the shield for engagement with the alignment formations. In one convenient form, the alignment formations are ridges on the silicon substrate positioned to engage the struts to maintain the apertures in alignment with the nozzle array.

The alignment formations necessarily use up a proportion of the surface area of the printhead, and this adversely affects the nozzle packing density. The extra printhead chip area required for the same number of nozzles will add to the cost of manufacturing the chip. However, where assembling the printhead and the nozzle guard is not likely to be sufficiently accurate, interengaging formations on the substrate and the guard will reduce the nozzle defect rate.

The nozzle guard may further include fluid inlet openings for directing fluid through the passages to inhibit the build up of foreign particles on the nozzle array. In this embodiment, the fluid inlet openings may be arranged in the struts.

It will be appreciated that, when air is directed through the openings, over the nozzle array and out through the passages, the build up of foreign particles on the nozzle array is inhibited.

The fluid inlet openings may be arranged in the support element remote from a bond pad of the nozzle array.

The present invention ensures that the fragile MEMS nozzles are protected during the manufacture and assembly of the printhead. By providing a nozzle guard for the printhead, the nozzle structures can be protected from being touched or bumped against most other surfaces during its operational life. To optimize the protection provided, the guard forms a flat shield covering the exterior side of the nozzles wherein the shield has an array of passages big enough to allow the ejection of ink droplets but small enough to prevent inadvertent contact or the ingress of most dust particles. By forming the shield from silicon, its coefficient of thermal expansion substantially matches that of the nozzle array. This will help to prevent the array of passages in the shield from falling out of register with the nozzle array. Using silicon also allows the shield to be accurately micro-machined using MEMS techniques. Furthermore, silicon is very strong and substantially non-deformable.

BRIEF DESCRIPTION OF THE DRAWINGS

Preferred embodiments of the invention are now described, by way of example only, with reference to the accompanying drawings in which.

DETAILED DESCRIPTION OF THE DRAWINGS

Figure 1:
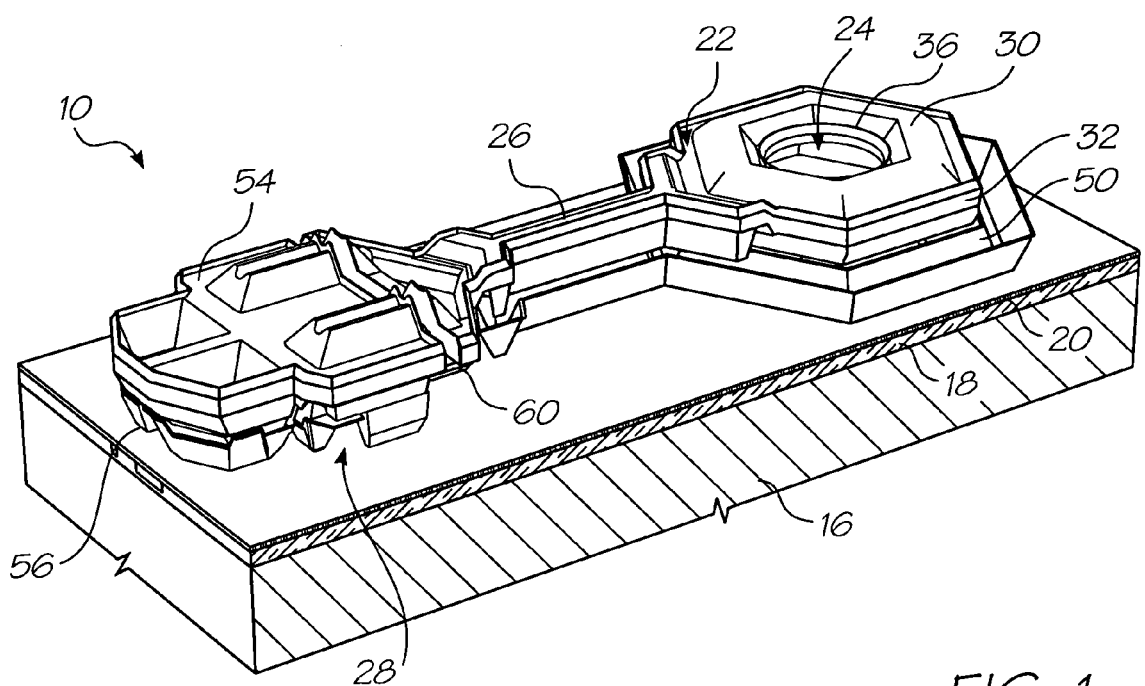
FIG. 1 shows a three dimensional, schematic view of a nozzle assembly for an ink jet printhead.

Referring initially to FIG. 1 of the drawings, a nozzle assembly, in accordance with the invention is designated generally by the reference numeral 10. An ink jet printhead has a plurality of nozzle assemblies 10 arranged in an array 14 (FIGS. 5 and 6) on a silicon substrate 16. The array 14 will be described in greater detail below.

The assembly 10 includes a silicon substrate or wafer 16 on which a dielectric layer 18 is deposited. A CMOS passivation layer 20 is deposited on the dielectric layer 18.

Each nozzle assembly 10 includes a nozzle 22 defining a nozzle opening 24, a connecting member in the form of a lever arm 26 and an actuator 28. The lever arm 26 connects the actuator 28 to the nozzle 22.

Figure 2:
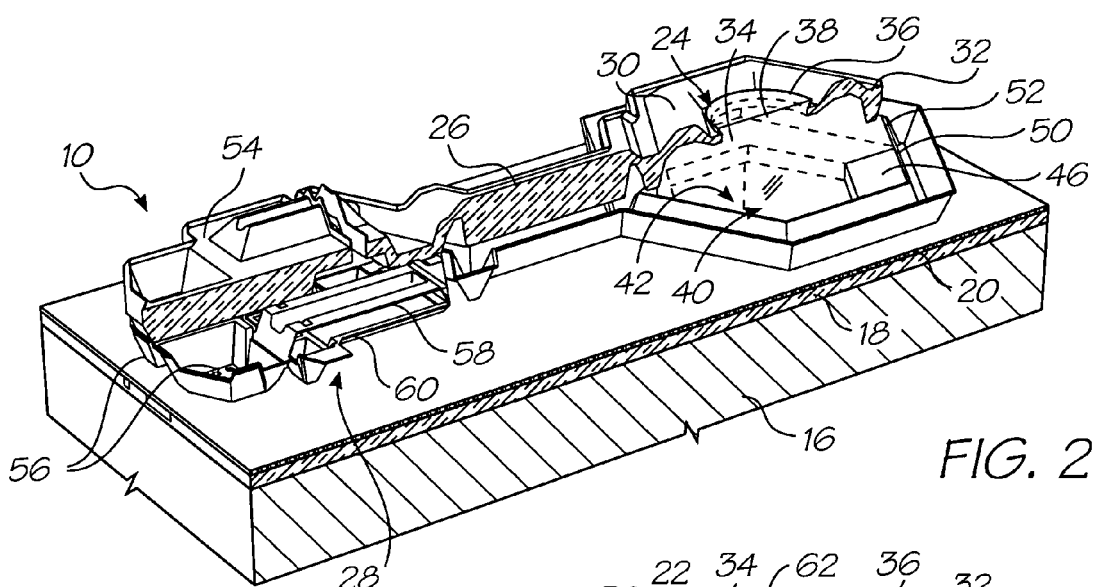
FIGS. 2 to 4 show a three dimensional, schematic illustration of an operation of the nozzle assembly of FIG. 1.
Figure 3:
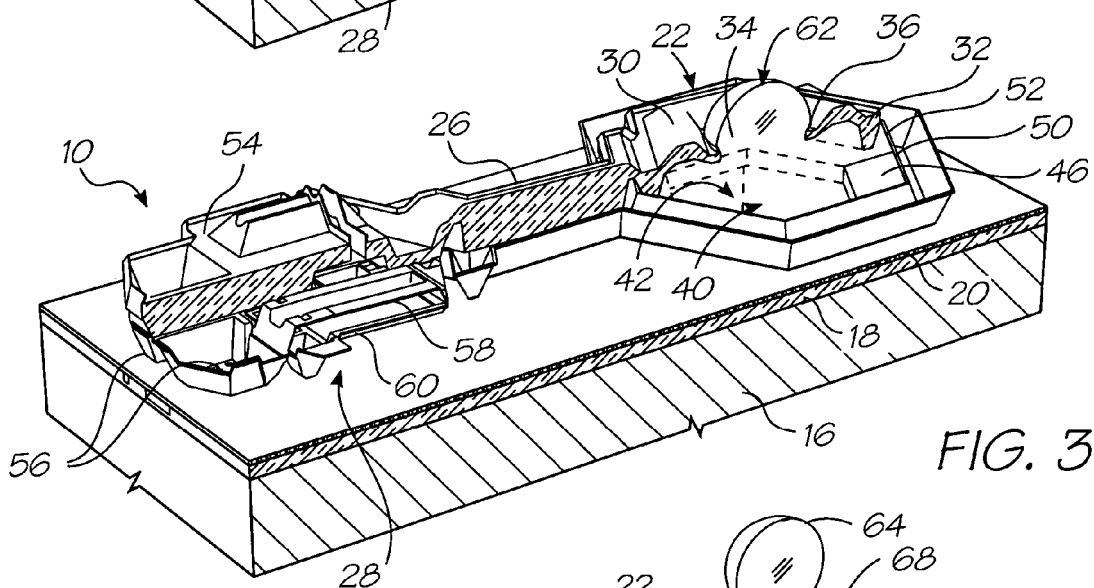
Figure 4:
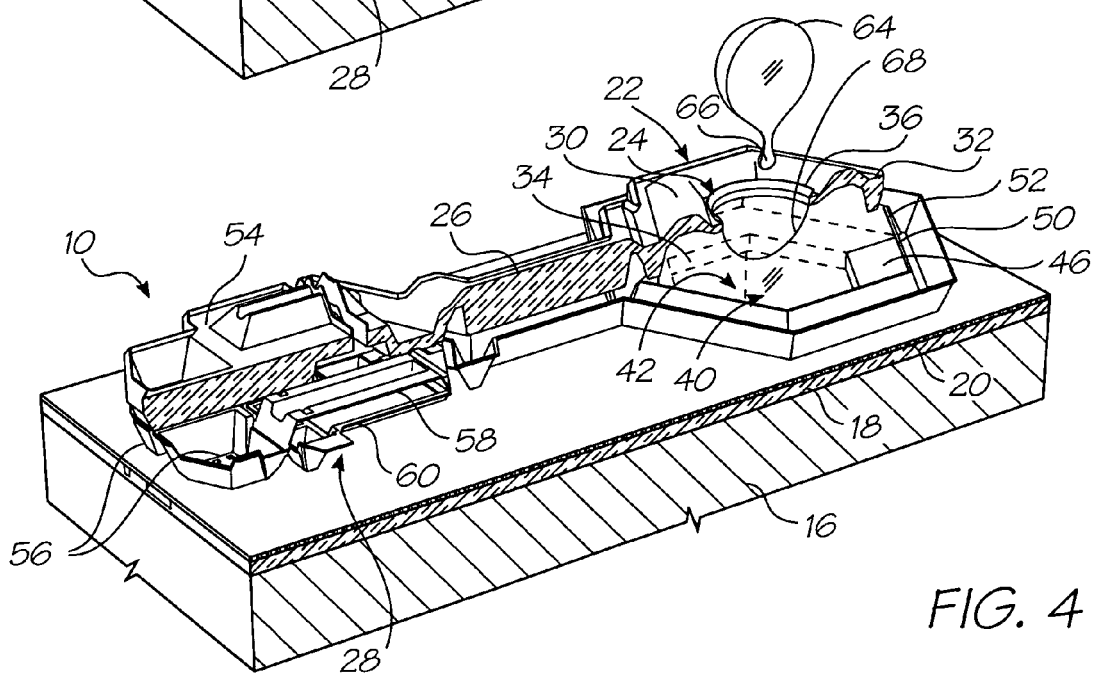

As shown in greater detail in FIGS. 2 to 4, the nozzle 22 comprises a crown portion 30 with a skirt portion 32 depending from the crown portion 30. The skirt portion 32 forms part of a peripheral wall of a nozzle chamber 34. The nozzle opening 24 is in fluid communication with the nozzle chamber 34. It is to be noted that the nozzle opening 24 is surrounded by a raised rim 36 which "pins" a meniscus 38 (FIG. 2) of a body of ink 40 in the nozzle chamber 34.

An ink inlet aperture 42 (shown most clearly in FIG. 6 of the drawings) is defined in a floor 46 of the nozzle chamber 34. The aperture 42 is in fluid communication with an ink inlet channel 48 defined through the substrate 16.

A wall portion 50 bounds the aperture 42 and extends upwardly from the floor portion 46. The skirt portion 32, as indicated above, of the nozzle 22 defines a first part of a peripheral wall of the nozzle chamber 34 and the wall portion 50 defines a second part of the peripheral wall of the nozzle chamber 34.

The wall 50 has an inwardly directed lip 52 at its free end which serves as a fluidic seal which inhibits the escape of ink when the nozzle 22 is displaced, as will be described in greater detail below. It will be appreciated that, due to the viscosity of the ink 40 and the small dimensions of the spacing between the lip 52 and the skirt portion 32, the inwardly directed lip 52 and surface tension function as an effective seal for inhibiting the escape of ink from the nozzle chamber 34.

The actuator 28 is a thermal bend actuator and is connected to an anchor 54 extending upwardly from the substrate 16 or, more particularly from the CMOS passivation layer 20. The anchor 54 is mounted on conductive pads 56 which form an electrical connection with the actuator 28.

The actuator 28 comprises a first, active beam 58 arranged above a second, passive beam 60. In a preferred embodiment, both beams 58 and 60 are of, or include, a conductive ceramic material such as titanium nitride (TiN).

Both beams 58 and 60 have their first ends anchored to the anchor 54 and their opposed ends connected to the arm 26. When a current is caused to flow through the active beam 58 thermal expansion of the beam 58 results. As the passive beam 60, through which there is no current flow, does not expand at the same rate, a bending moment is created causing the arm 26 and, hence, the nozzle 22 to be displaced downwardly towards the substrate 16 as shown in FIG. 3. This causes an ejection of ink through the nozzle opening 24 as shown at 62. When the source of heat is removed from the active beam 58, i.e. by stopping current flow, the nozzle 22 returns to its quiescent position as shown in FIG. 4. When the nozzle 22 returns to its quiescent position, an ink droplet 64 is formed as a result of the breaking of an ink droplet neck as illustrated at 66 in FIG. 4. The ink droplet 64 then travels on to the print media such as a sheet of paper. As a result of the formation of the ink droplet 64, a "negative" meniscus is formed as shown at 68 in FIG. 4 of the drawings. This "negative" meniscus 68 results in an inflow of ink 40 into the nozzle chamber 34 such that a new meniscus 38 (FIG. 2) is formed in readiness for the next ink drop ejection from the nozzle assembly 10.

Figure 5:
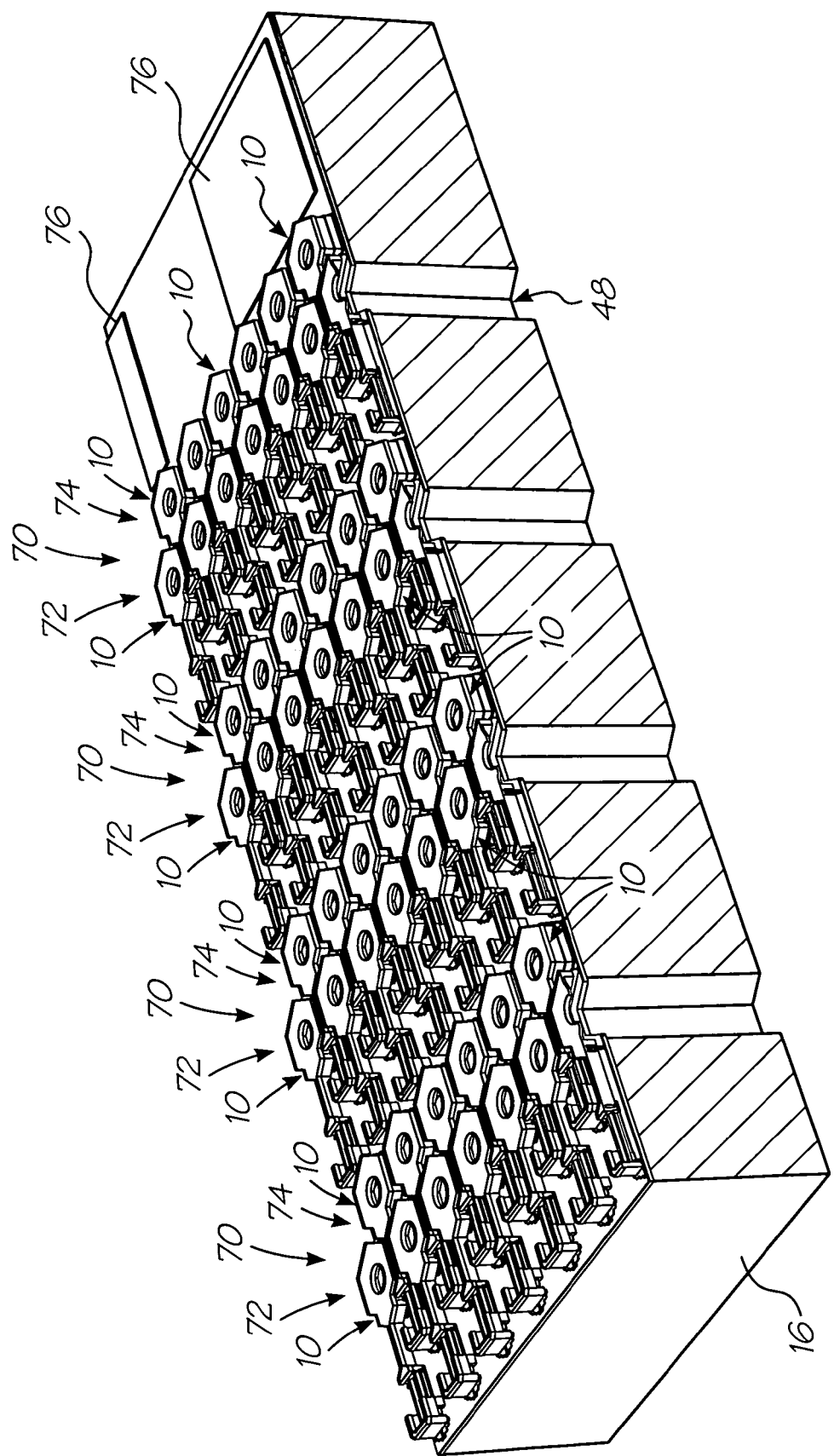
FIG. 5 shows a three dimensional view of a nozzle array constituting an ink jet printhead with a nozzle guard or containment walls.
Figure 6:
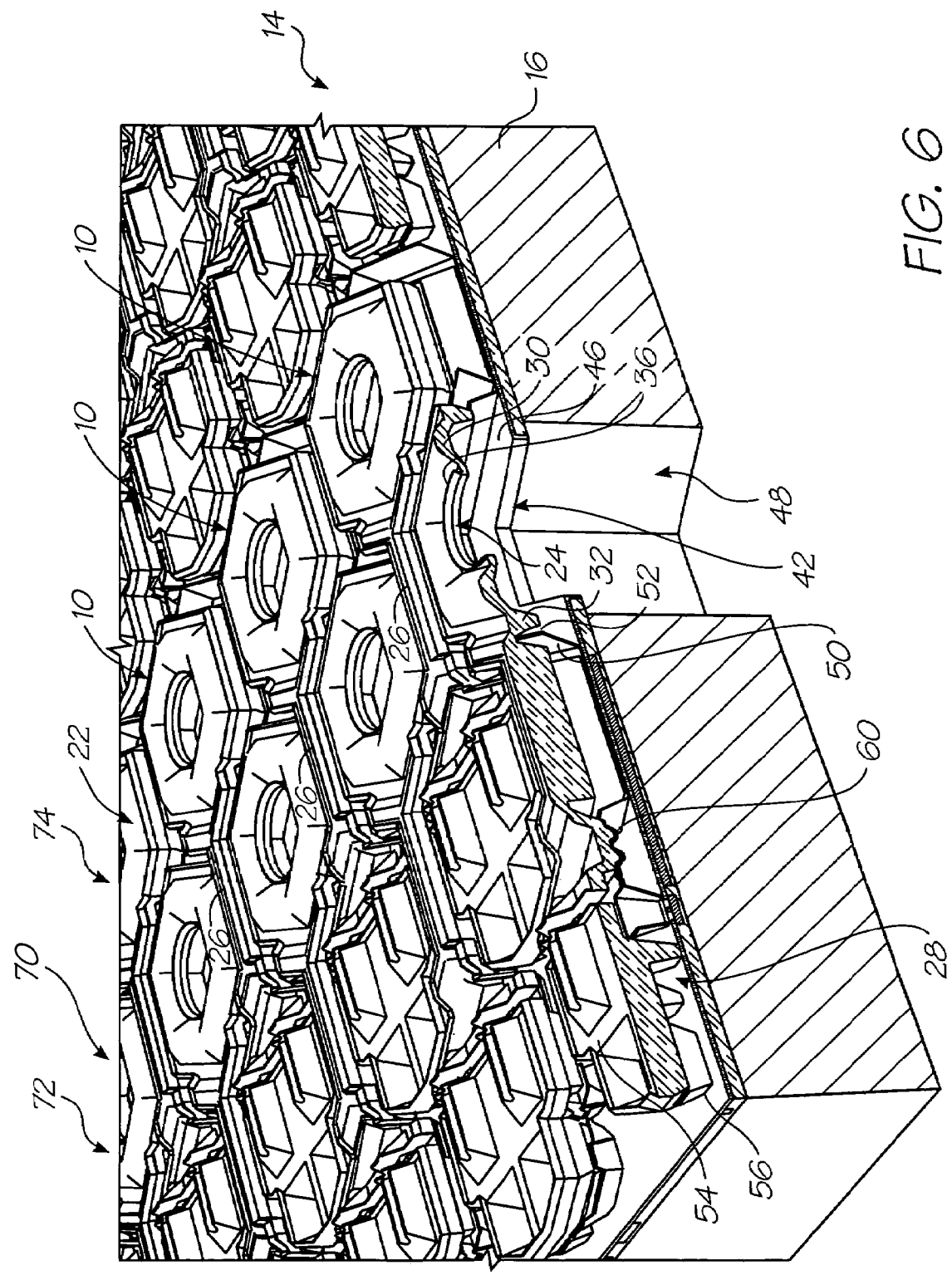
FIG. 6 shows, on an enlarged scale, part of the array of FIG. 5.

Referring now to FIGS. 5 and 6 of the drawings, the nozzle array 14 is described in greater detail. The array 14 is for a four-color printhead. Accordingly, the array 14 includes four groups 70 of nozzle assemblies, one for each color. Each group 70 has its nozzle assemblies 10 arranged in two rows 72 and 74. One of the groups 70 is shown in greater detail in FIG. 6.

To facilitate close packing of the nozzle assemblies 10 in the rows 72 and 74, the nozzle assemblies 10 in the row 74 are offset or staggered with respect to the nozzle assemblies 10 in the row 72. Also, the nozzle assemblies 10 in the row 72 are spaced apart sufficiently far from each other to enable the lever arms 26 of the nozzle assemblies 10 in the row 74 to pass between adjacent nozzles 22 of the assemblies 10 in the row 72. It is to be noted that each nozzle assembly 10 is substantially dumbbell shaped so that the nozzles 22 in the row 72 nest between the nozzles 22 and the actuators 28 of adjacent nozzle assemblies 10 in the row 74.

Further, to facilitate close packing of the nozzles 22 in the rows 72 and 74, each nozzle 22 is substantially hexagonally shaped.

It will be appreciated by those skilled in the art that, when the nozzles 22 are displaced towards the substrate 16, in use, due to the nozzle opening 24 being at a slight angle with respect to the nozzle chamber 34 ink is ejected slightly off the perpendicular. It is an advantage of the arrangement shown in FIGS. 5 and 6 of the drawings that the actuators 28 of the nozzle assemblies 10 in the rows 72 and 74 extend in the same direction to one side of the rows 72 and 74. Hence, the ink ejected from the nozzles 22 in the row 72 and the ink ejected from the nozzles 22 in the row 74 are offset with respect to each other by the same angle resulting in an improved print quality.

Also, as shown in FIG. 5 of the drawings, the substrate 16 has bond pads 76 arranged thereon which provide the electrical connections, via the pads 56, to the actuators 28 of the nozzle assemblies 10. These electrical connections are formed via the CMOS layer (not shown).

Figure 5B:
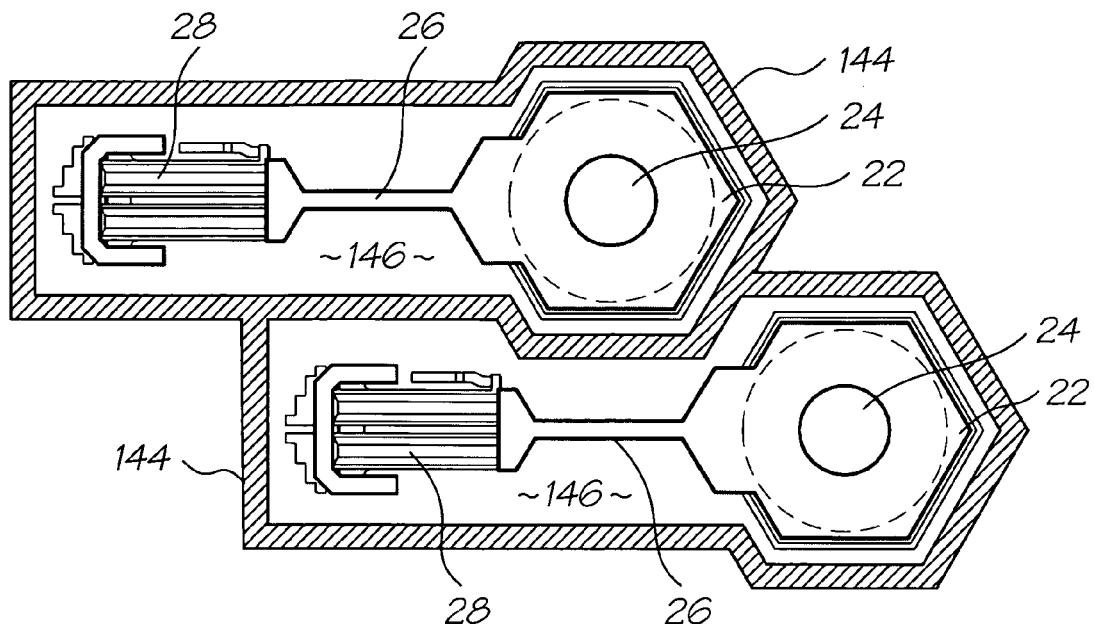
FIG. 5b shows a sectioned plan view of nozzles taken through the containment walls isolating each nozzle.
Figure 5A:
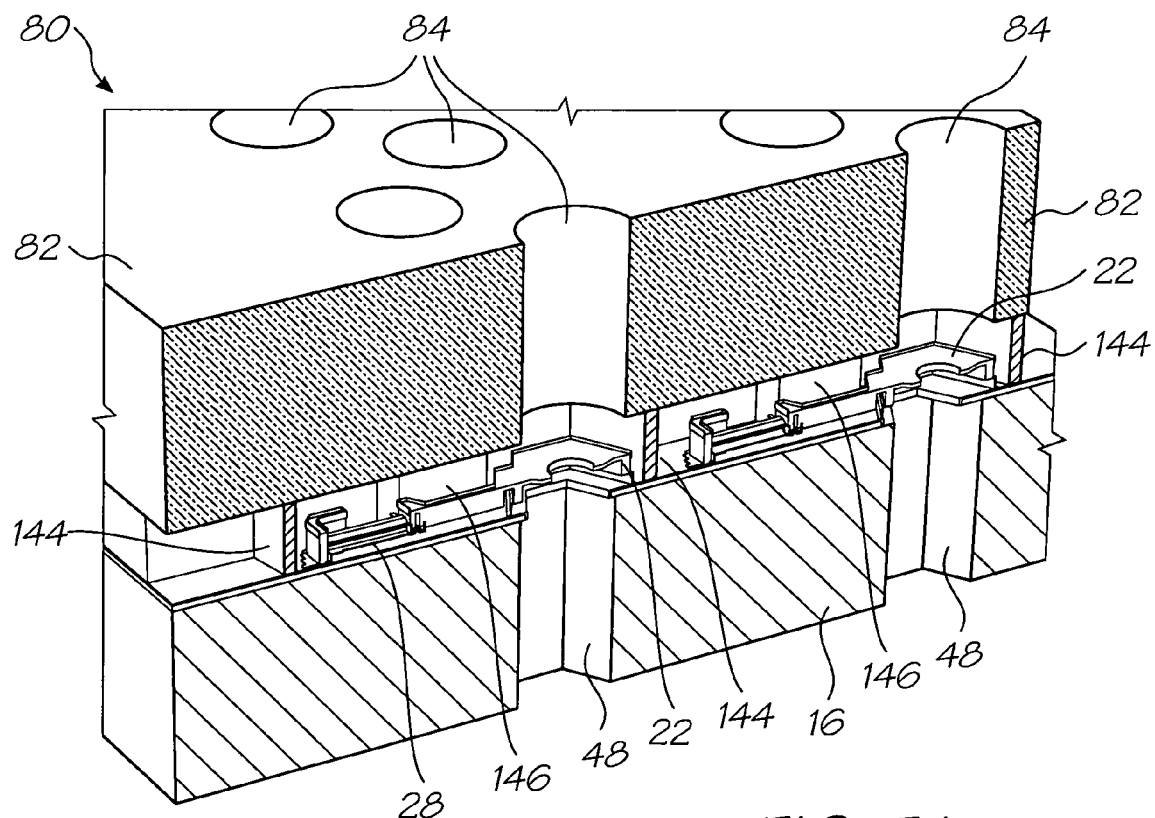
FIG. 5a shows a three-dimensional sectioned view of a printhead with a nozzle guard and containment walls.

Referring to FIGS. 5a and 5b, the nozzle array 14 shown in FIG. 5 has been spaced to accommodate a containment formation surrounding each nozzle assembly 10. The containment formation is a containment wall 144 surrounding the nozzle 22 and extending from the silicon substrate 16 to the underside of an apertured nozzle guard 80 to form a containment chamber 146. If ink is not properly ejected because of nozzle damage, the leakage is confined so as not to affect the function of surrounding nozzles. It is also envisaged that each containment chamber 146 will have the ability to detect the presence of leaked ink and provide feedback to the microprocessor controlling the actuation of the nozzle array 14. Using a fault tolerance facility, the damaged can be compensated for by the remaining nozzles in the array 14 thereby maintaining print quality.

The containment walls 144 necessarily occupy a proportion of the silicon substrate 16 which decreases the nozzle packing density of the array. This in turn increases the production costs of the printhead chip. However where the manufacturing techniques result in a relatively high nozzle attrition rate, individual nozzle containment formations will avoid, or at least minimize any adverse effects to the print quality.

It will be appreciated by those in the art, that the containment formation could also be configured to isolate groups of nozzles. Isolating groups of nozzles provides a better nozzle packing density but compensating for damaged nozzles using the surrounding nozzle groups is more difficult.

Figure 7:
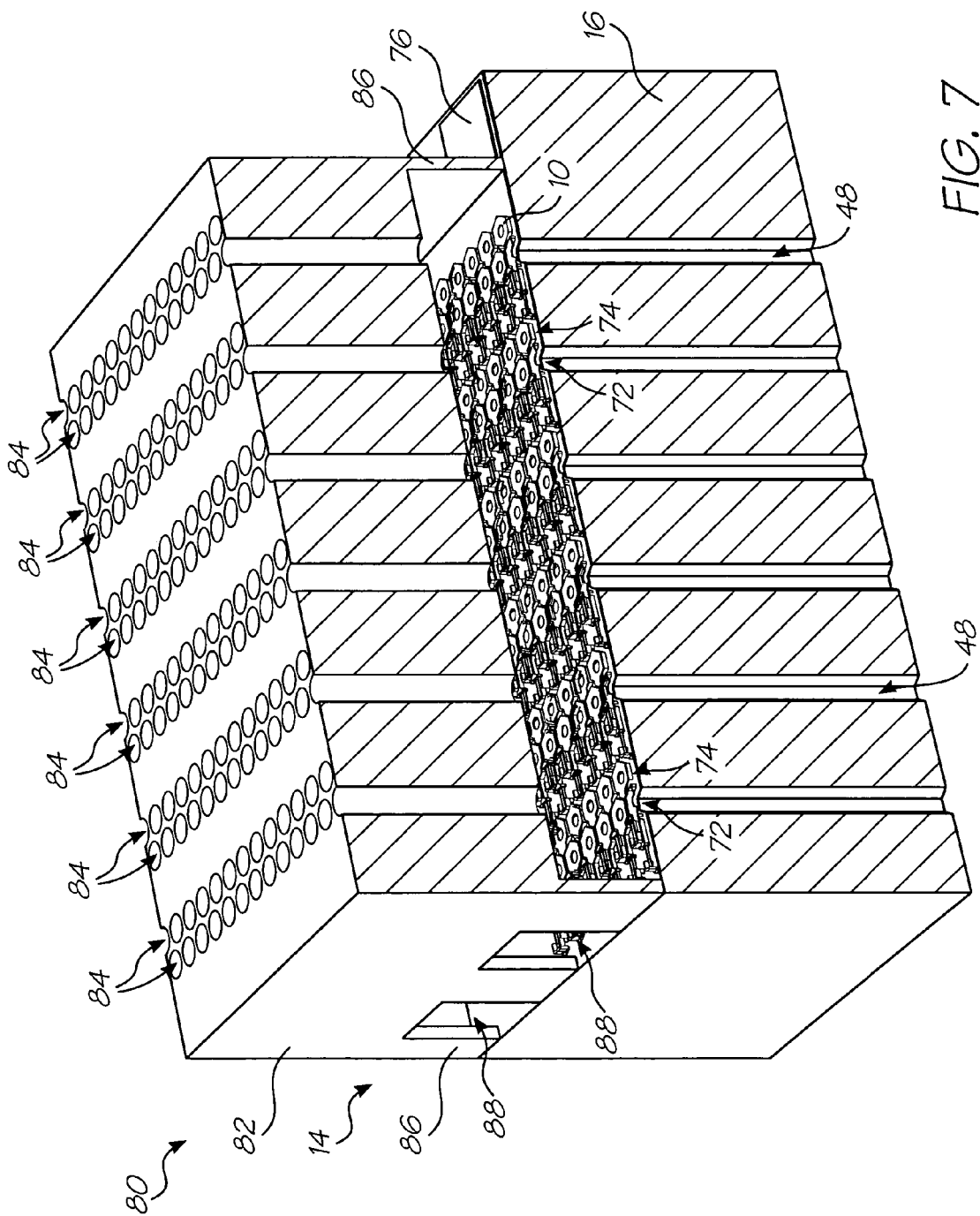
FIG. 7 shows a three dimensional view of an ink jet printhead including a nozzle guard without the containment walls.

Referring to FIG. 7, a nozzle guard for protecting the nozzle array is shown. With reference to the previous drawings, like reference numerals refer to like parts, unless otherwise specified.

A nozzle guard 80 is mounted on the silicon substrate 16 of the array 14. The nozzle guard 80 includes a shield 82 having a plurality of apertures 84 defined therethrough. The apertures 84 are in registration with the nozzle openings 24 of the nozzle assemblies 10 of the array 14 such that, when ink is ejected from any one of the nozzle openings 24, the ink passes through the associated passage before striking the print media.

The guard 80 is silicon so that it has the necessary strength and rigidity to protect the nozzle array 14 from damaging contact with paper, dust or the users' fingers. By forming the guard from silicon, its coefficient of thermal expansion substantially matches that of the nozzle array. This aims to prevent the apertures 84 in the shield 82 from falling out of register with the nozzle array 14 as the printhead heats up to its normal operating temperature. Silicon is also well suited to accurate micro-machining using MEMS techniques discussed in greater detail below in relation to the manufacture of the nozzle assemblies 10.

The shield 82 is mounted in spaced relationship relative to the nozzle assemblies 10 by limbs or struts 86. One of the struts 86 has air inlet openings 88 defined therein.

In use, when the array 14 is in operation, air is charged through the inlet openings 88 to be forced through the apertures 84 together with ink traveling through the apertures 84.

The ink is not entrained in the air as the air is charged through the apertures 84 at a different velocity from that of the ink droplets 64. For example, the ink droplets 64 are ejected from the nozzles 22 at a velocity of approximately 3 m/s. The air is charged through the apertures 84 at a velocity of approximately 1 m/s.

The purpose of the air is to maintain the apertures 84 clear of foreign particles. A danger exists that these foreign particles, such as dust particles, could fall onto the nozzle assemblies 10 adversely affecting their operation. With the provision of the air inlet openings 88 in the nozzle guard 80 this problem is, to a large extent, obviated.

Figure 7A:
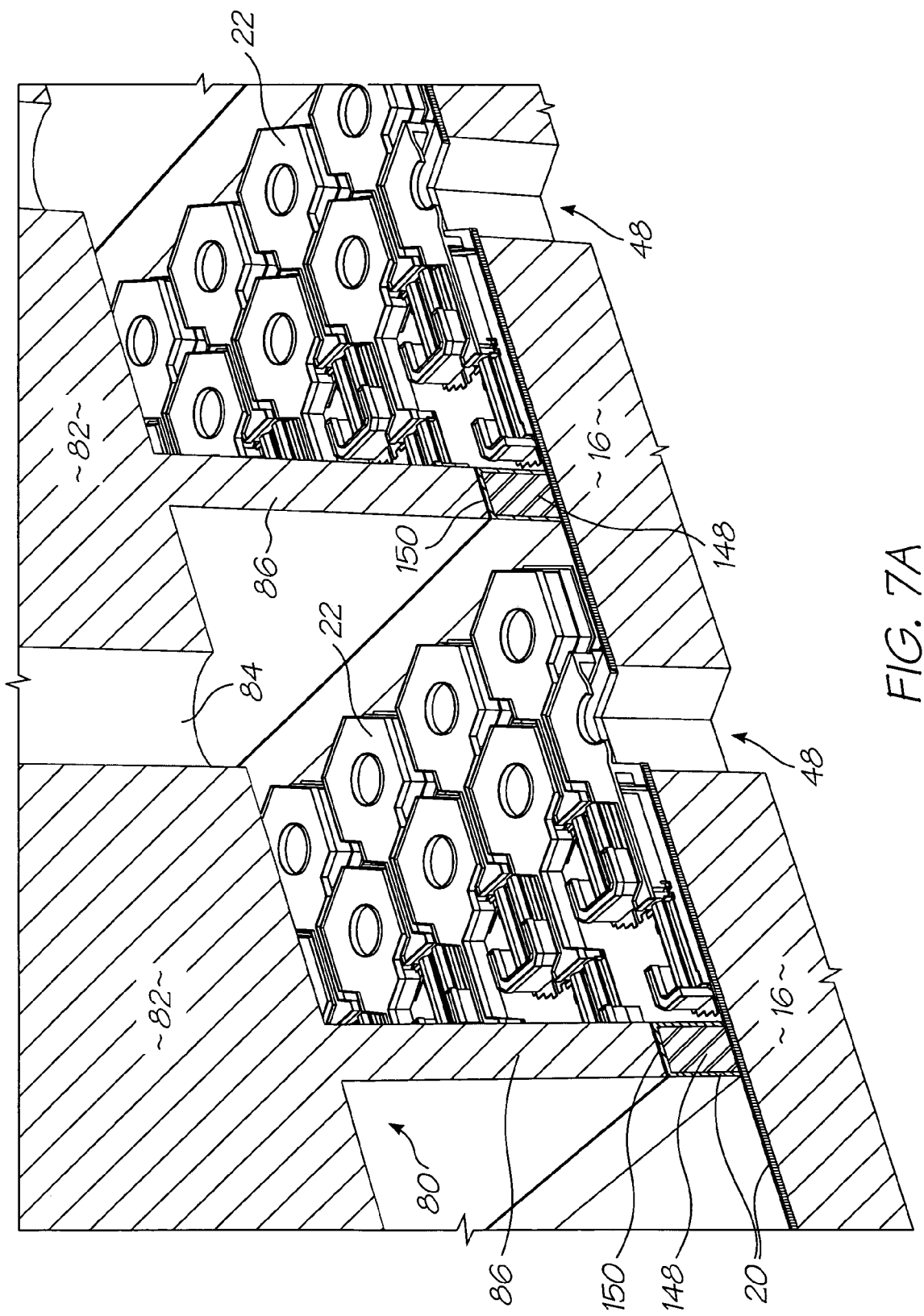
FIG. 7a shows an enlarged partial perspective of an ink jet print head with alignment formations engaging the complementary formations on the nozzle guard.

The alignment between the apertures 84 and the nozzles 22 is crucial. However, the microscopic scale of MEMS devices makes precise positioning of the guard 80 over the nozzles difficult. As shown in FIG. 7a, the silicon wafer or substrate 16 can be provided with alignment formations such as ridges 148 for engaging the free ends of the struts 86. If the sacrificial material used is polyimide, an inorganic seal 150 is sandwiched between the end of the support 86 and the ridge 148. The ridges 148 may be accurately formed together with the nozzles 22 using the same etching and deposition techniques.

FIG. 7a shows trapped sacrificial material such as polyimide forming the alignment ridges 148. In other arrangements, extra ridges 148 engage the containment walls 144 shown in FIGS. 5a and 5b. In this form, the ridges 148 will occupy some surface area and adversely affect the nozzle packing density, but it will firmly hold each aperture 84 in alignment with the respective nozzles 22. An inorganic seal 150 is positioned between the struts 86 and the ridges 148.

Of course other arrangements can provide alignment formations such as recesses or sockets in the wafer substrate 16 that engage complementary formations provided on the guard 80.

Alignment formations formed using CMOS etching and deposition techniques can provide an alignment accuracy of the order of 0.1 μm.

Figure 7B:
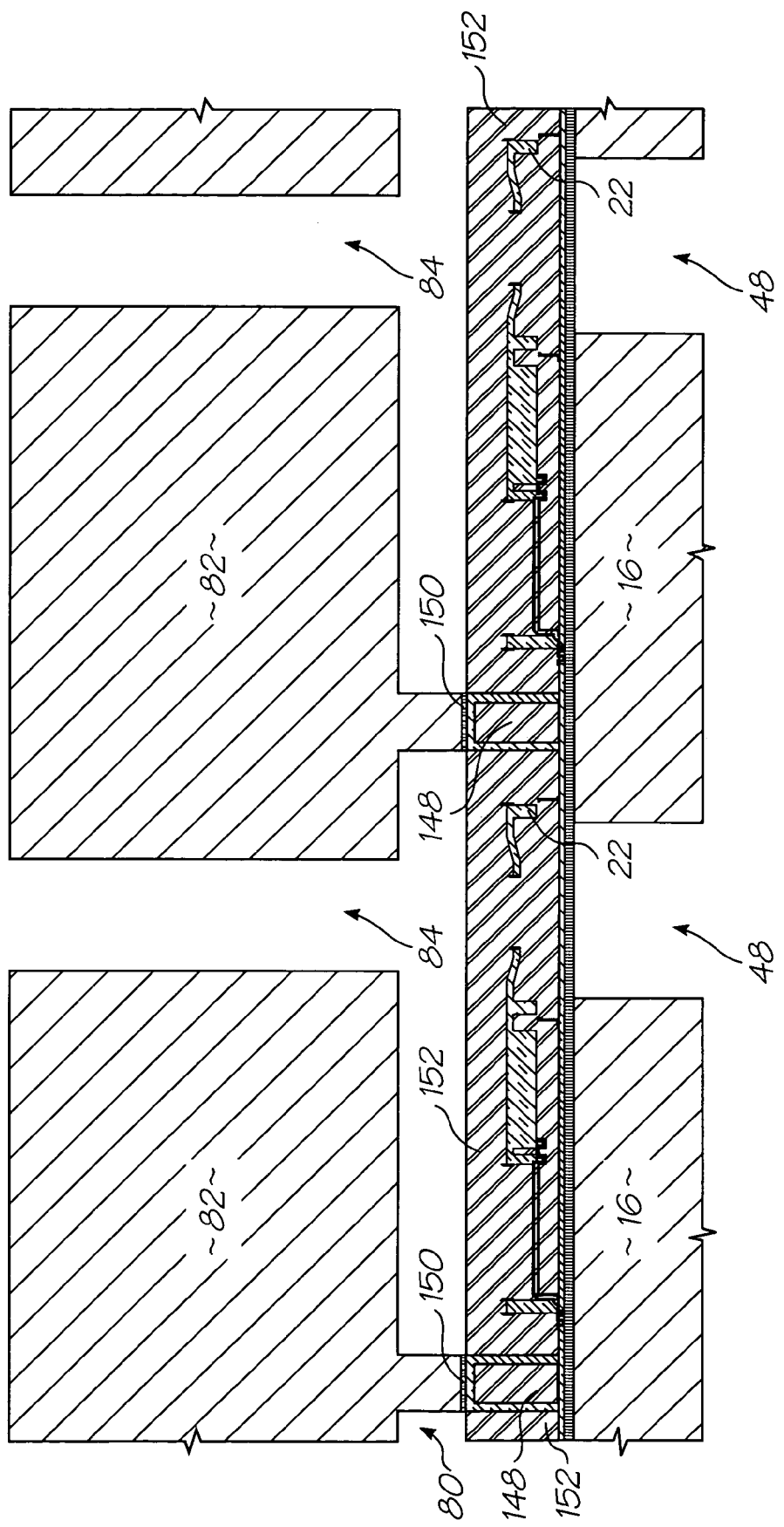
FIG. 7b shows a sectional view of a nozzle assembly encased in sacrificial polyimide beneath the attached nozzle guard.
Figure 7C:
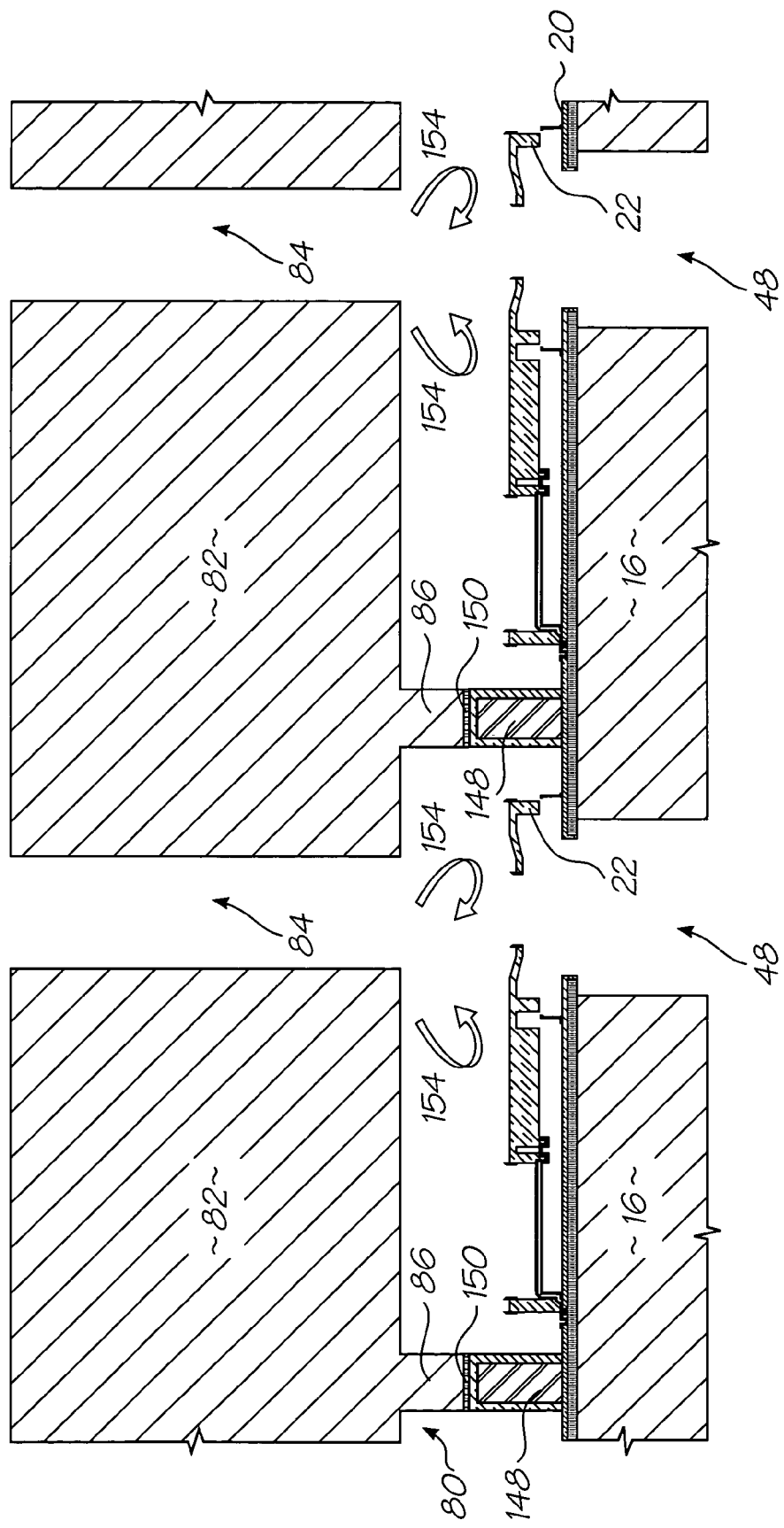
FIG. 7c shows the etching plasma flow removing the sacrificial material surrounding the nozzle assembly.

While aligning the guard 80 on the alignment formations 148, the fragile nozzles 22 are prone to damage because of contact with the struts 86. As shown in FIG. 7b, the nozzles 22 can be encased in sacrificial material 152 for protection until the guard 80 has been aligned and fixed to the ridges 148. Referring the FIG. 7c, once the guard 80 is in place, the protective sacrificial material 152 is released by an oxygen plasma etch 154 and removed through the apertures 84.

Referring now to FIGS. 8 to 10 of the drawings, a process for manufacturing the nozzle assemblies 10 is described.

Starting with the silicon substrate 16, the dielectric layer 18 is deposited on a surface of the wafer 16. The dielectric layer 18 is in the form of approximately 1.5 microns of CVD oxide. Resist is spun on to the layer 18 and the layer 18 is exposed to mask 100 and is subsequently developed.

After being developed, the layer 18 is plasma etched down to the silicon layer 16. The resist is then stripped and the layer 18 is cleaned. This step defines the ink inlet aperture 42.

Figure 8A:
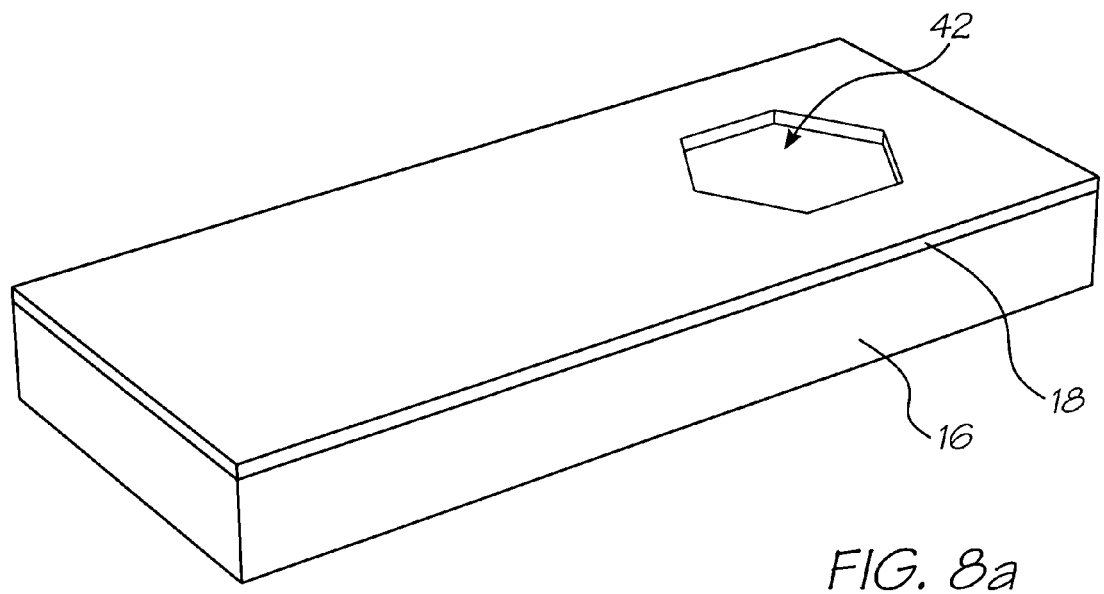
FIGS. 8a to 8r show three-dimensional views of steps in the manufacture of a nozzle assembly of an ink jet printhead.
Figure 9A:
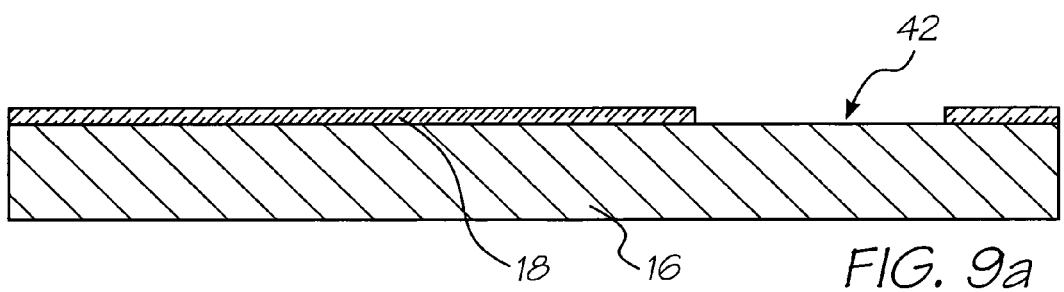
FIGS. 9a to 9r show sectional side views of the manufacturing steps.
Figure 10A:
FIGS. 10a to 10k show layouts of masks used in various steps in the manufacturing process.
Figure 8B:
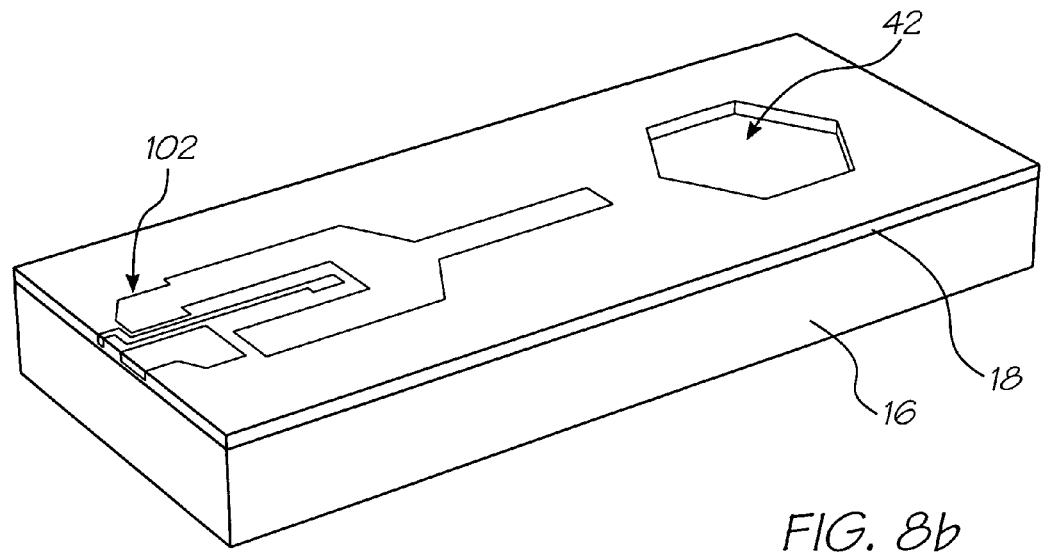
Figure 9B:
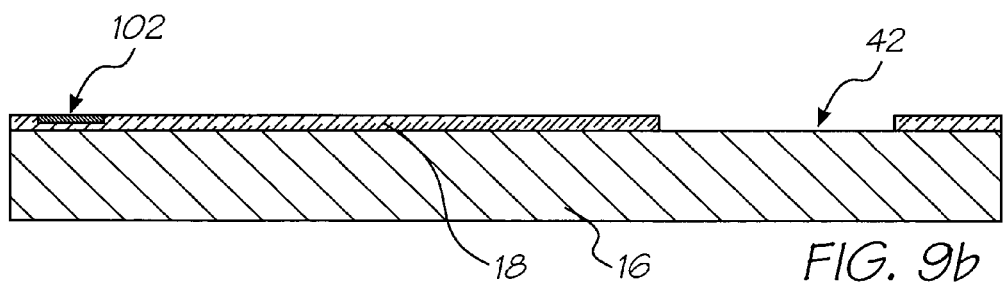
Figure 10B:
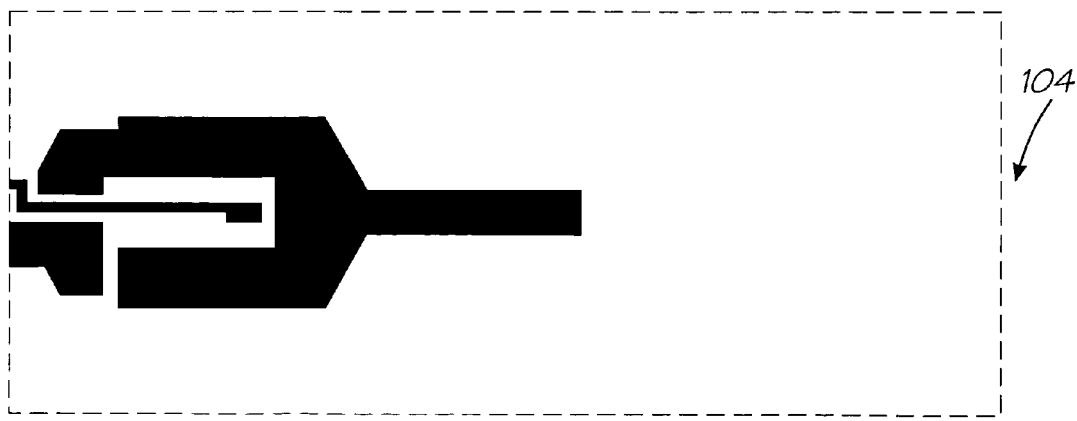
Figure 8C:
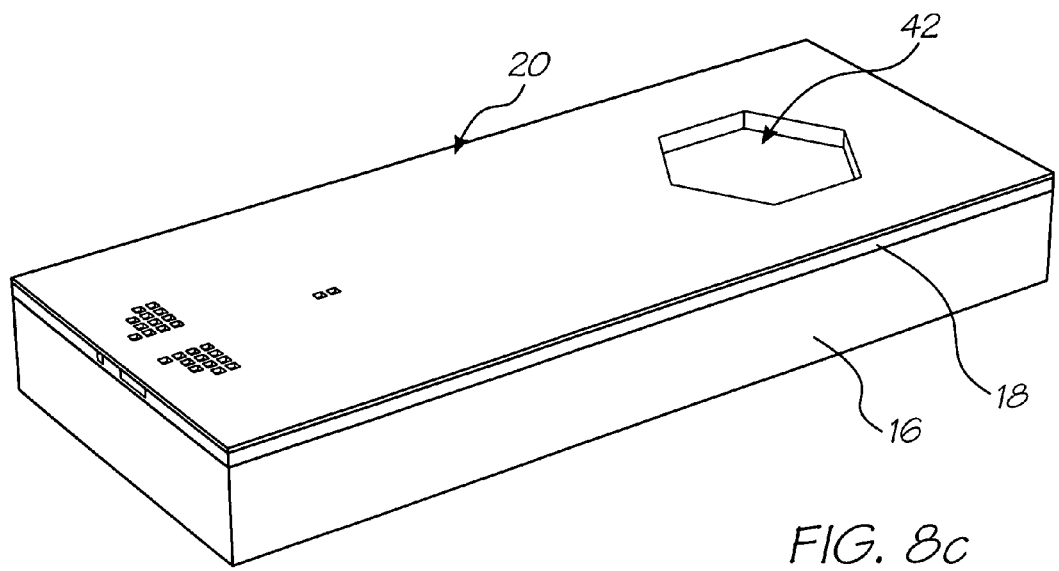
Figure 9C:
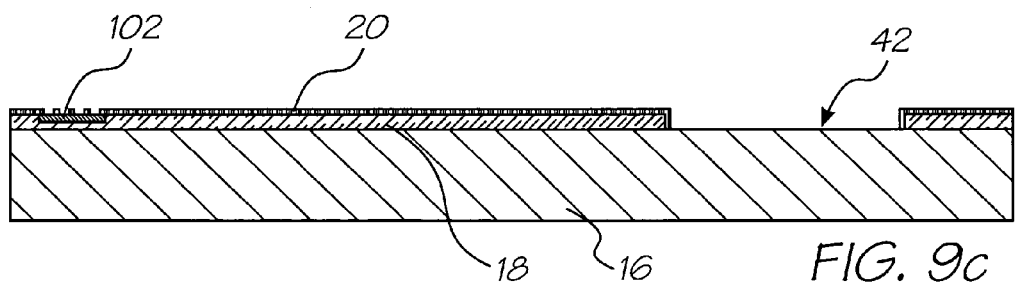
Figure 10C:
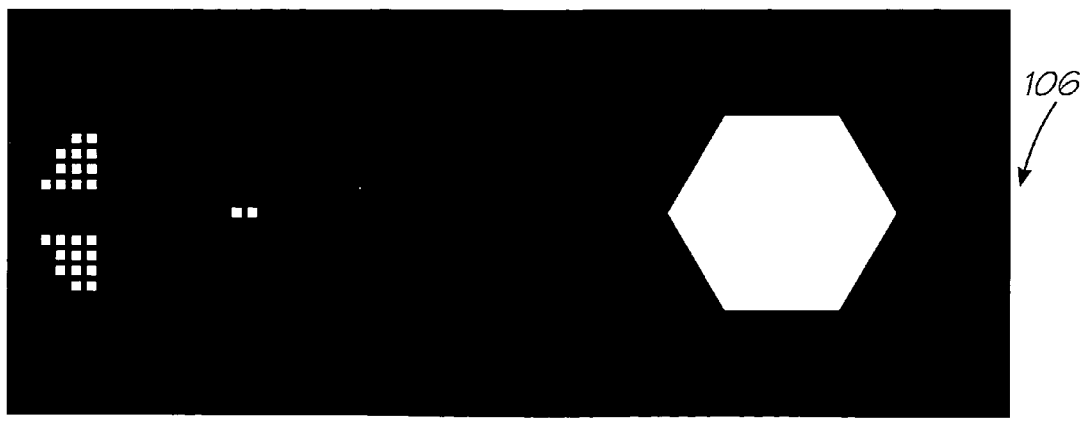
Figure 8D:
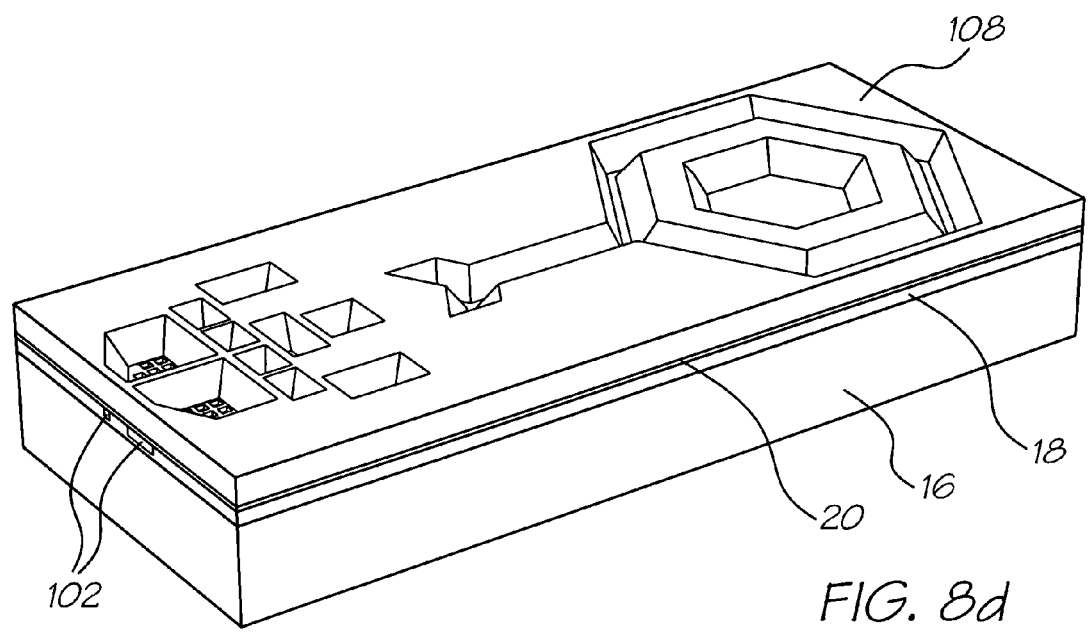
Figure 9D:
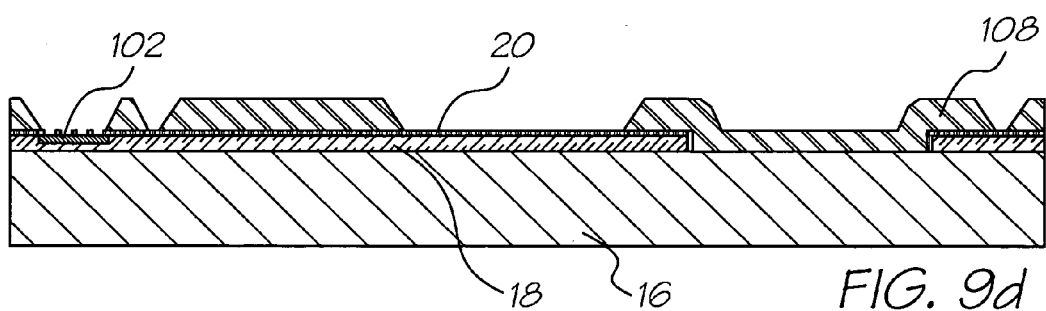
Figure 10D:
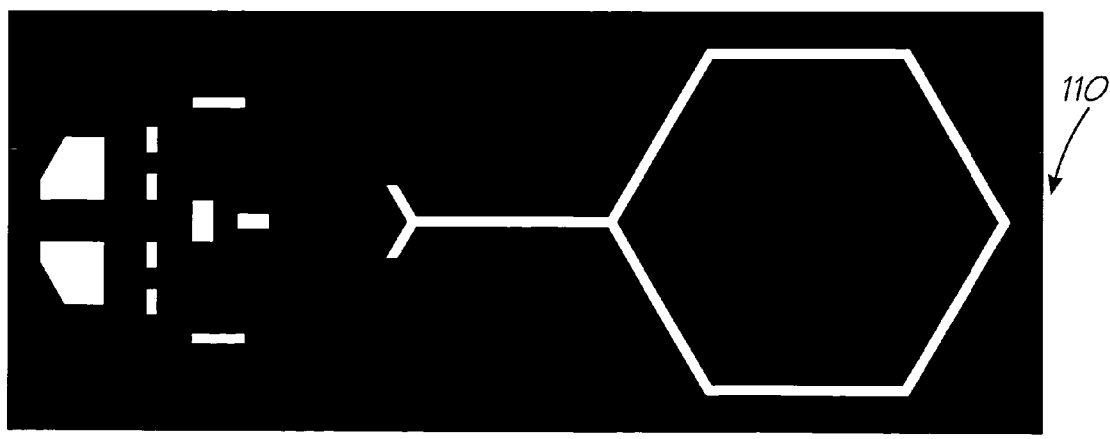

In FIG. 8b of the drawings, approximately 0.8 microns of aluminum 102 is deposited on the layer 18. Resist is spun on and the aluminum 102 is exposed to mask 104 and developed. The aluminum 102 is plasma etched down to the oxide layer 18, the resist is stripped and the device is cleaned. This step provides the bond pads and interconnects to the ink jet actuator 28. This interconnect is to an NMOS drive transistor and a power plane with connections made in the CMOS layer (not shown).

Approximately 0.5 microns of PECVD nitride is deposited as the CMOS passivation layer 20. Resist is spun on and the layer 20 is exposed to mask 106 whereafter it is developed. After development, the nitride is plasma etched down to the aluminum layer 102 and the silicon layer 16 in the region of the inlet aperture 42. The resist is stripped and the device cleaned.

A layer 108 of a sacrificial material is spun on to the layer 20. The layer 108 is 6 microns of photosensitive polyimide or approximately 4 μm of high temperature resist. The layer 108 is softbaked and is then exposed to mask 110 whereafter it is developed. The layer 108 is then hardbaked at 400° C. for one hour where the layer 108 is comprised of polyimide or at greater than 300° C. where the layer 108 is high temperature resist. It is to be noted in the drawings that the pattern-dependent distortion of the polyimide layer 108 caused by shrinkage is taken into account in the design of the mask 110.

Figure 8E:
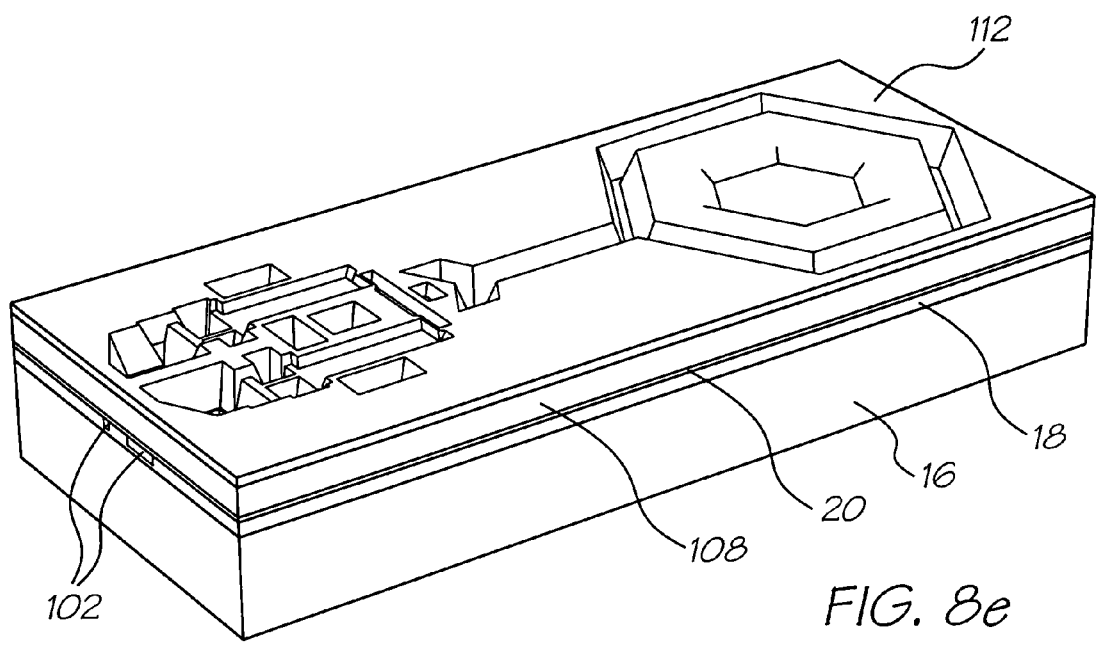
Figure 10E:
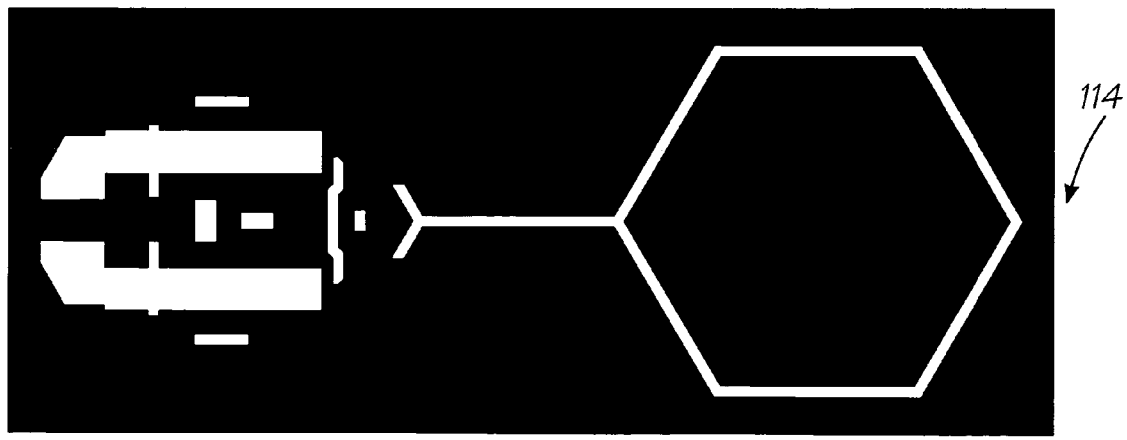
Figure 8F:
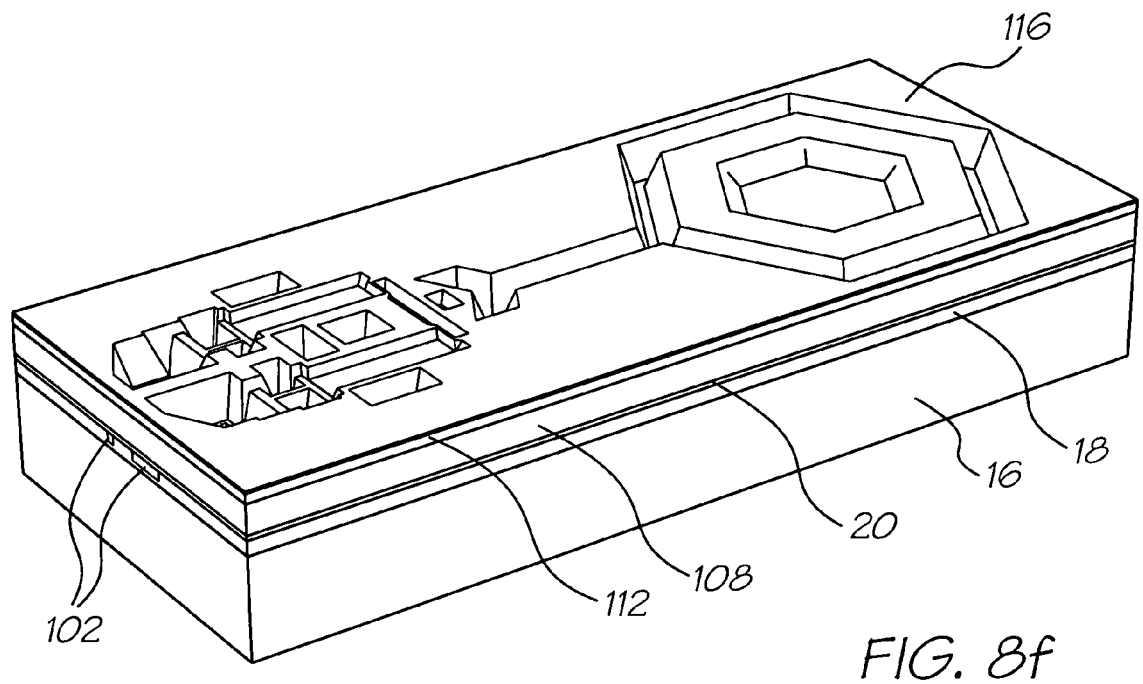
Figure 8G:
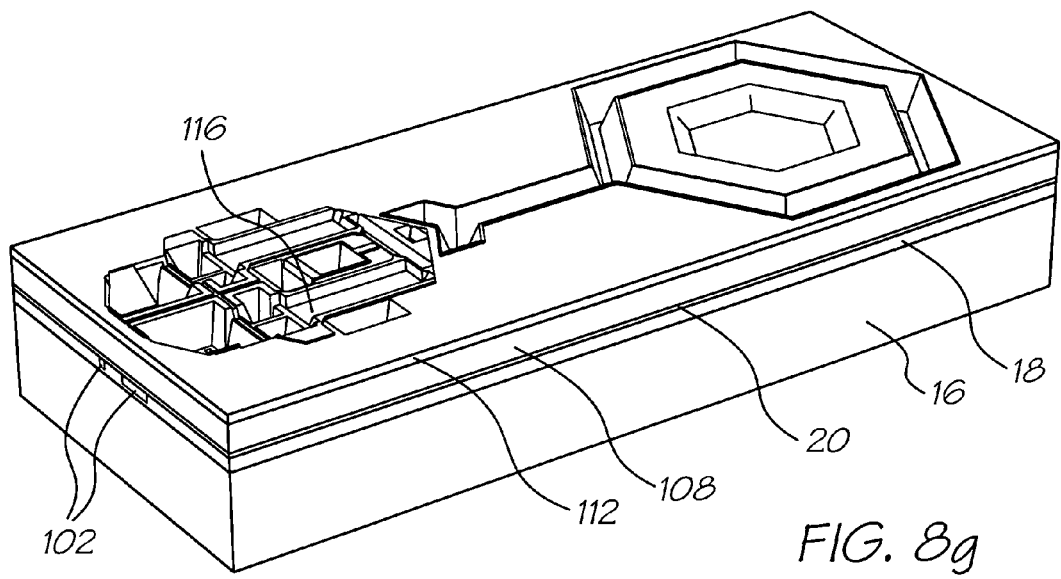
Figure 10F:
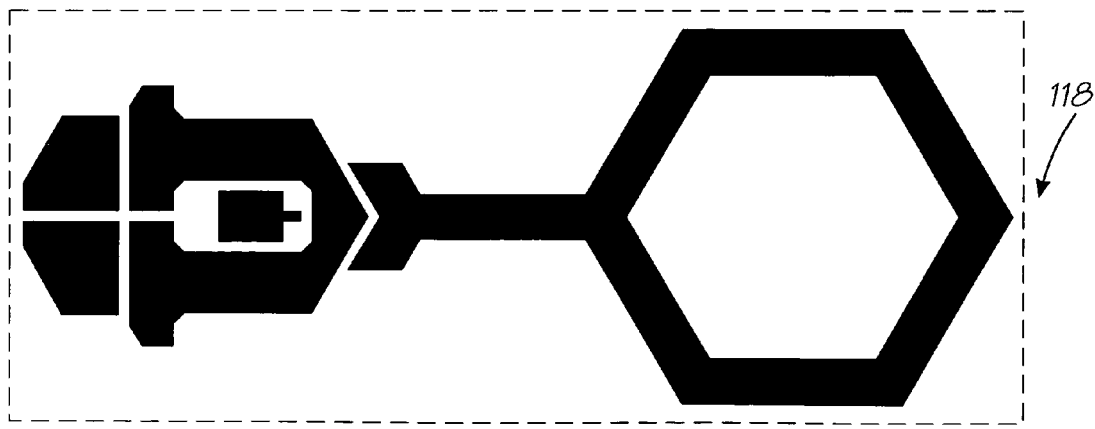
Figure 8H:
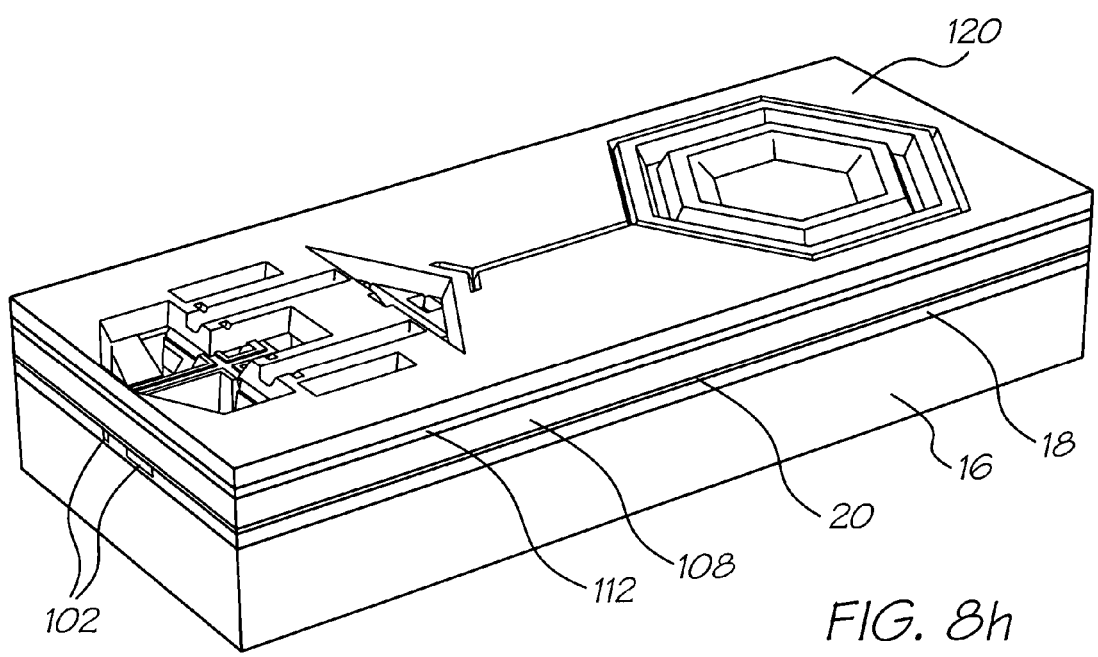
Figure 10G:
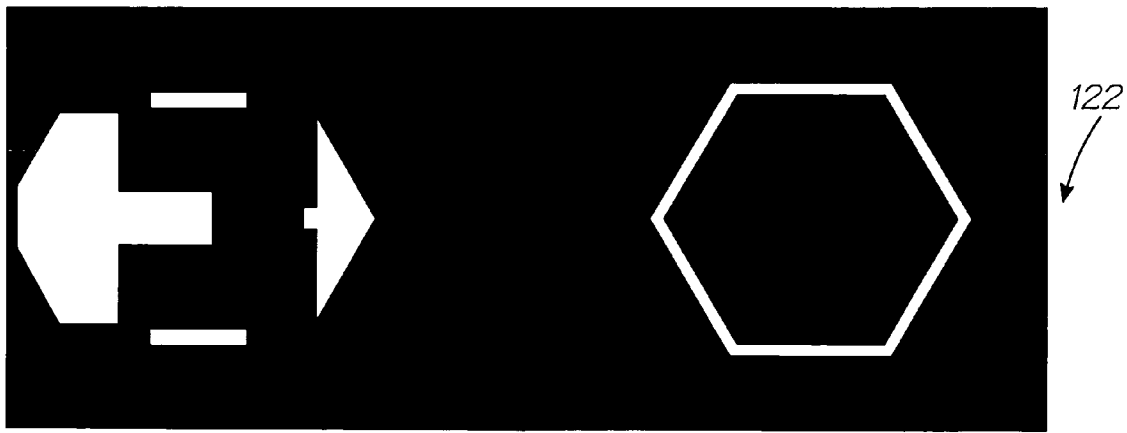
Figure 8I:
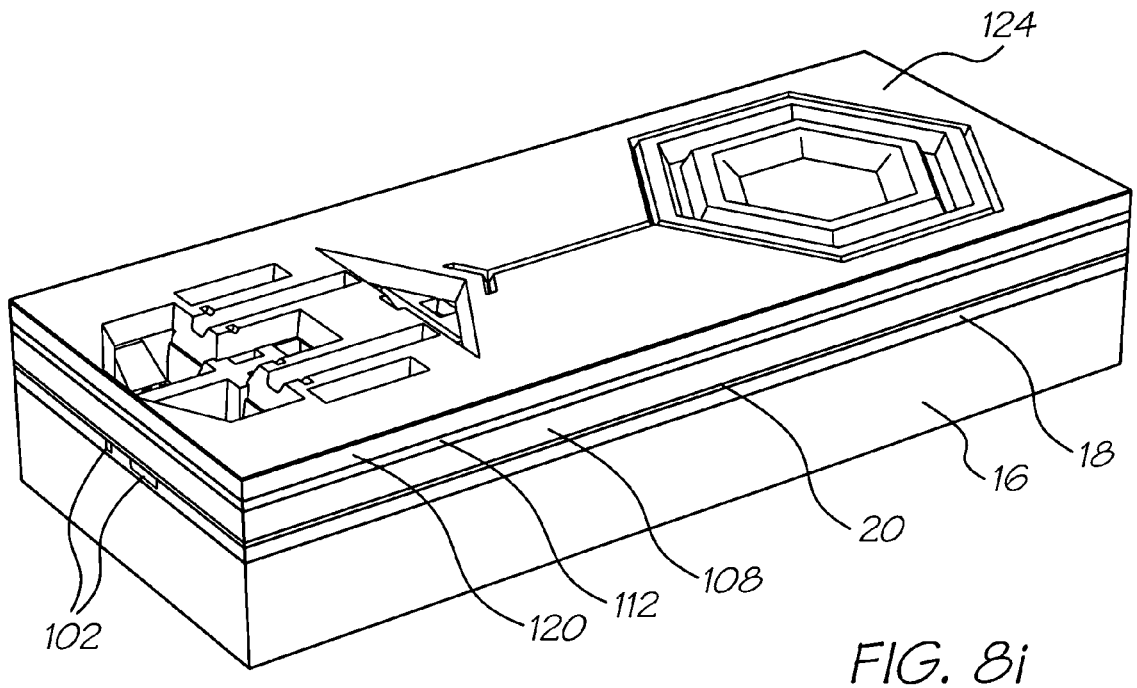
Figure 8J:
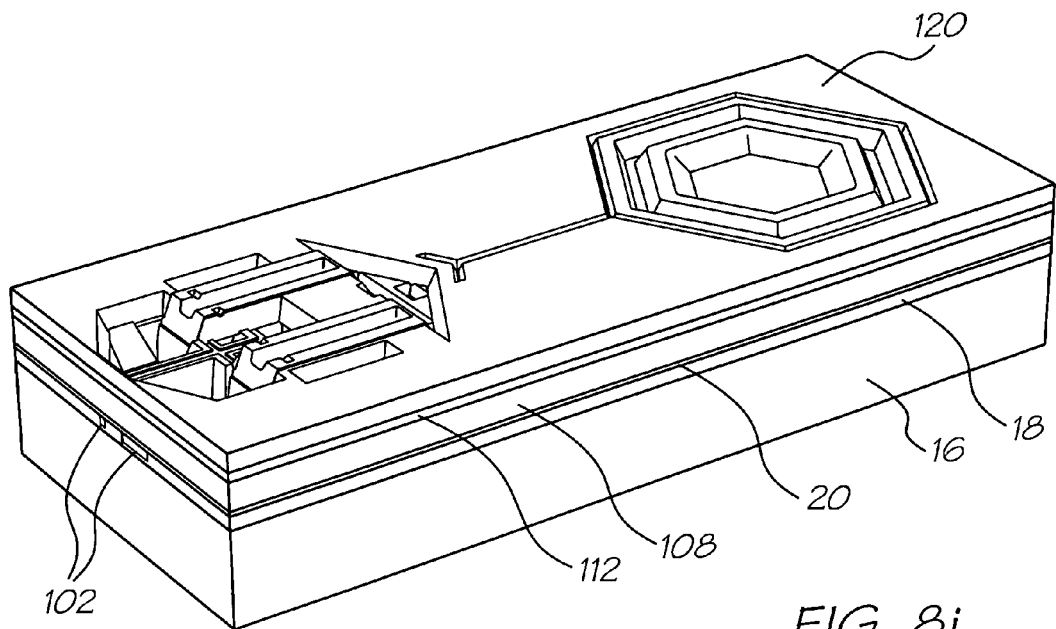
Figure 10H:
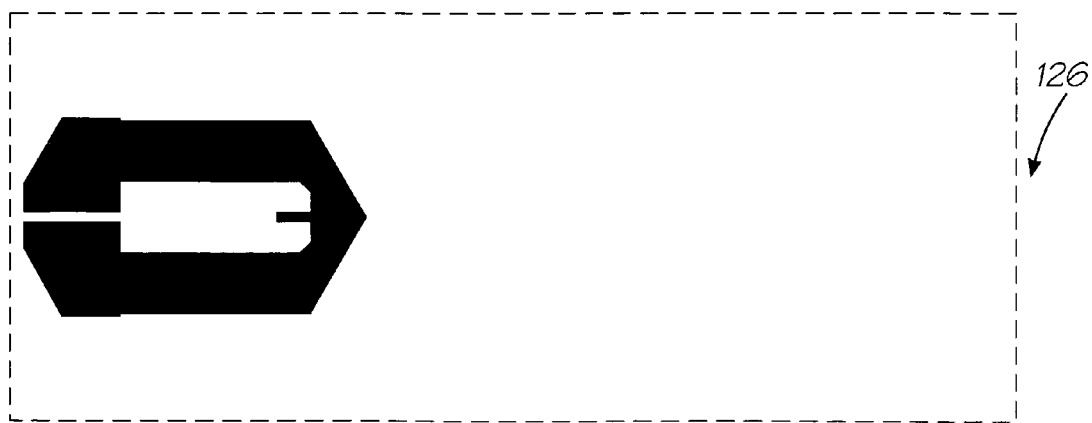
Figure 8K:
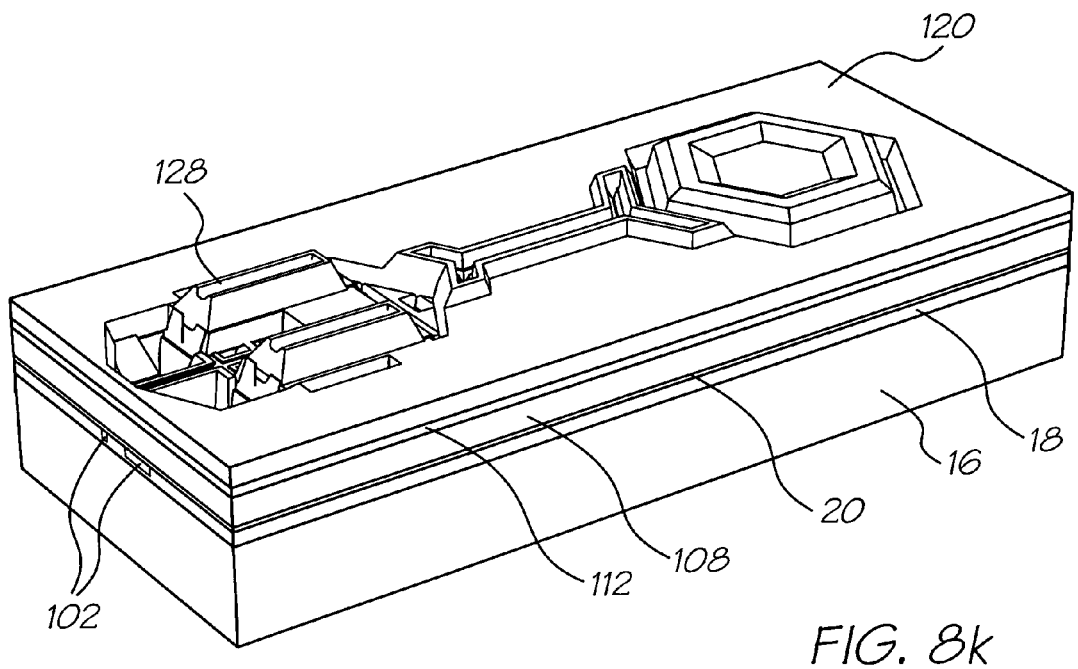

In the next step, shown in FIG. 8e of the drawings, a second sacrificial layer 112 is applied. The layer 112 is either 2 μm of photosensitive polyimide which is spun on or approximately 1.3 μm of high temperature resist. The layer 112 is softbaked and exposed to mask 114. After exposure to the mask 114, the layer 112 is developed. In the case of the layer 112 being polyimide, the layer 112 is hardbaked at 400° C. for approximately one hour. Where the layer 112 is resist, it is hardbaked at greater than 300° C. for approximately one hour.

A 0.2-micron multi-layer metal layer 116 is then deposited. Part of this layer 116 forms the passive beam 60 of the actuator 28.

The layer 116 is formed by sputtering 1,000 Å of titanium nitride (TiN) at around 300° C. followed by sputtering 50 Å of tantalum nitride (TaN). A further 1,000 Å of TiN is sputtered on followed by 50 Å of TaN and a further 1,000 Å of TiN. Other materials which can be used instead of TiN are $TiB_2$, $MoSi_2$ or (Ti, Al)N.

The layer 116 is then exposed to mask 118, developed and plasma etched down to the layer 112 whereafter resist, applied for the layer 116, is wet stripped taking care not to remove the cured layers 108 or 112.

A third sacrificial layer 120 is applied by spinning on 4 μm of photosensitive polyimide or approximately 2.6 μm high temperature resist. The layer 120 is softbaked whereafter it is exposed to mask 122. The exposed layer is then developed followed by hard baking. In the case of polyimide, the layer 120 is hardbaked at 400° C. for approximately one hour or at greater than 300° C. where the layer 120 comprises resist.

A second multi-layer metal layer 124 is applied to the layer 120. The constituents of the layer 124 are the same as the layer 116 and are applied in the same manner. It will be appreciated that both layers 116 and 124 are electrically conductive layers.

The layer 124 is exposed to mask 126 and is then developed. The layer 124 is plasma etched down to the polyimide or resist layer 120 whereafter resist applied for the layer 124 is wet stripped taking care not to remove the cured layers 108, 112 or 120. It will be noted that the remaining part of the layer 124 defines the active beam 58 of the actuator 28.

Figure 9E:
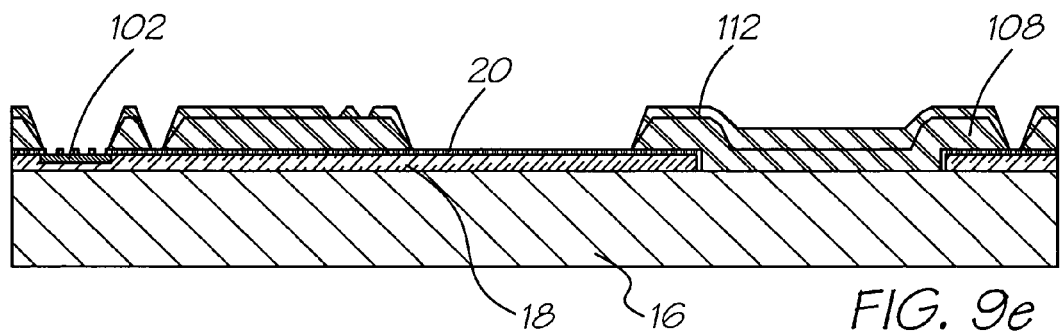
Figure 9F:
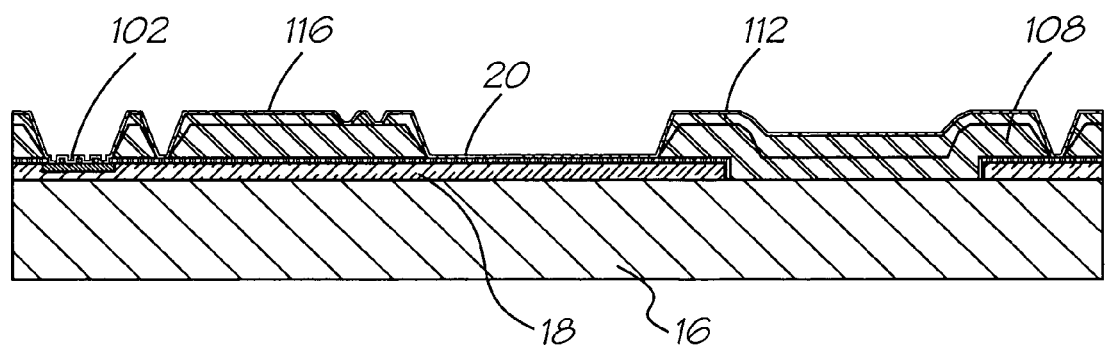
Figure 9G:
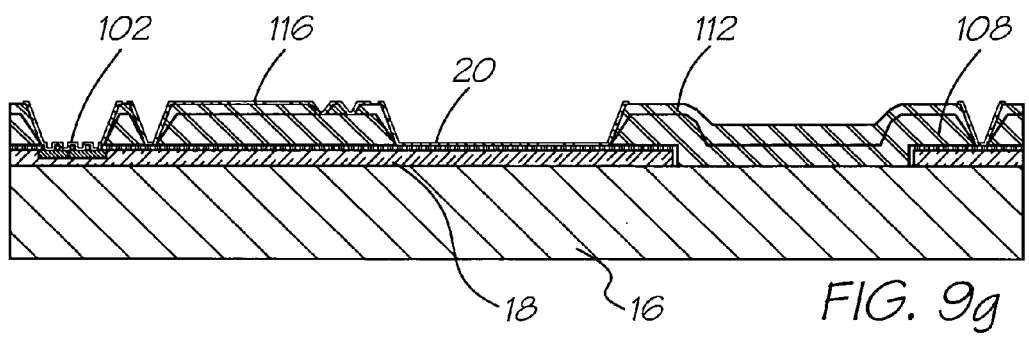
Figure 9H:
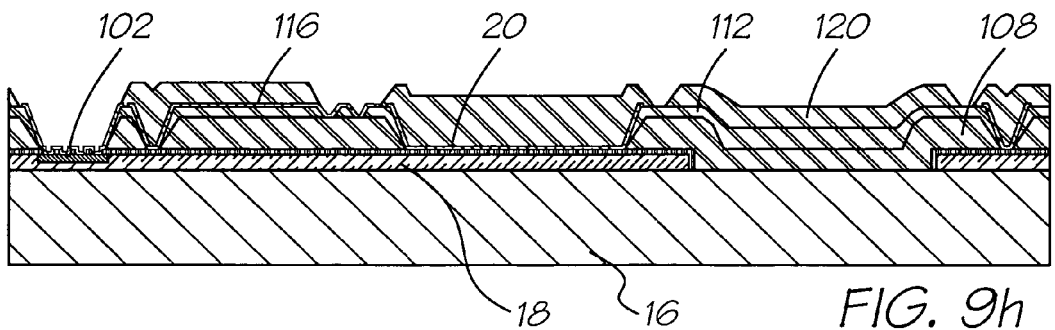
Figure 9I:
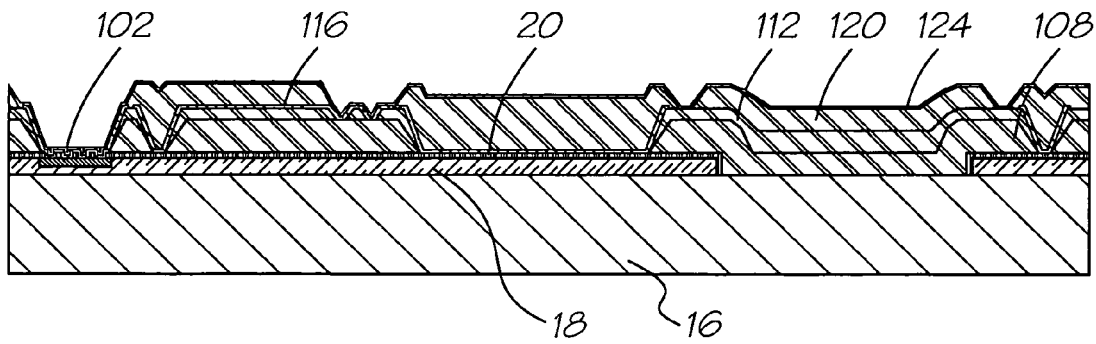
Figure 9J:
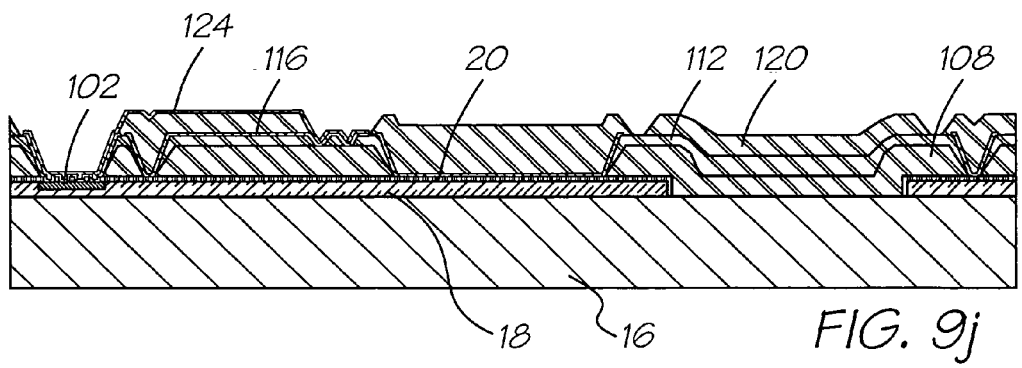
Figure 9K:
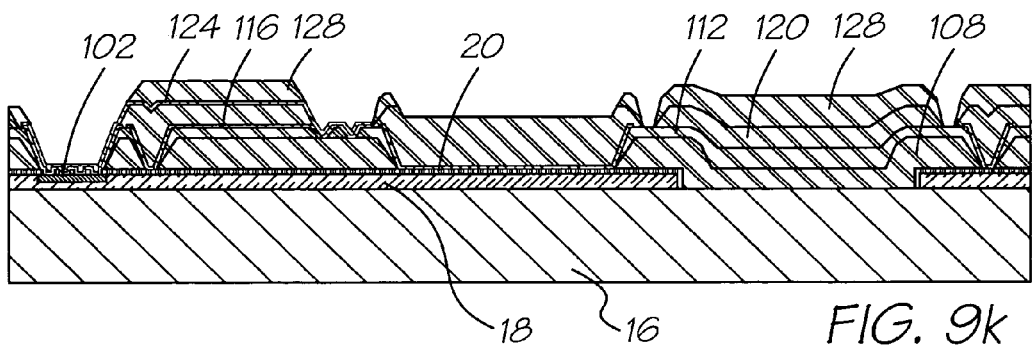
Figure 10I:
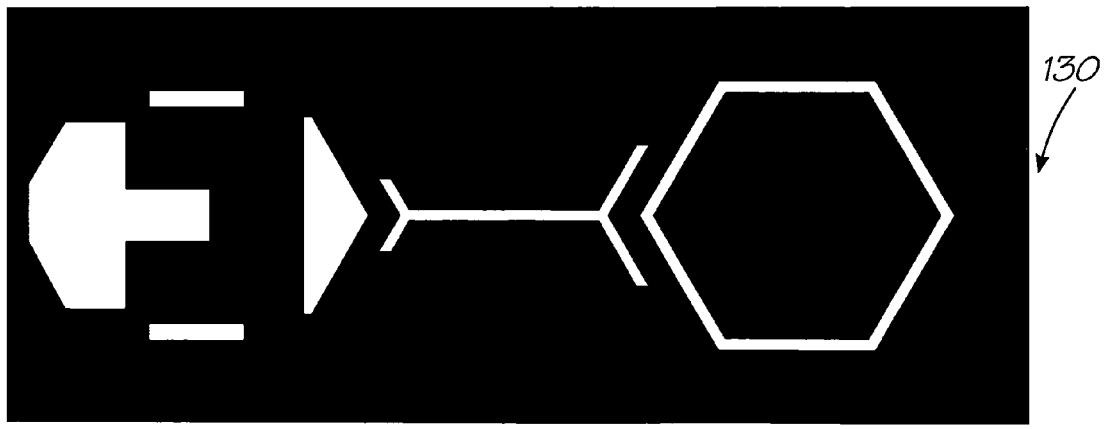
Figure 81:
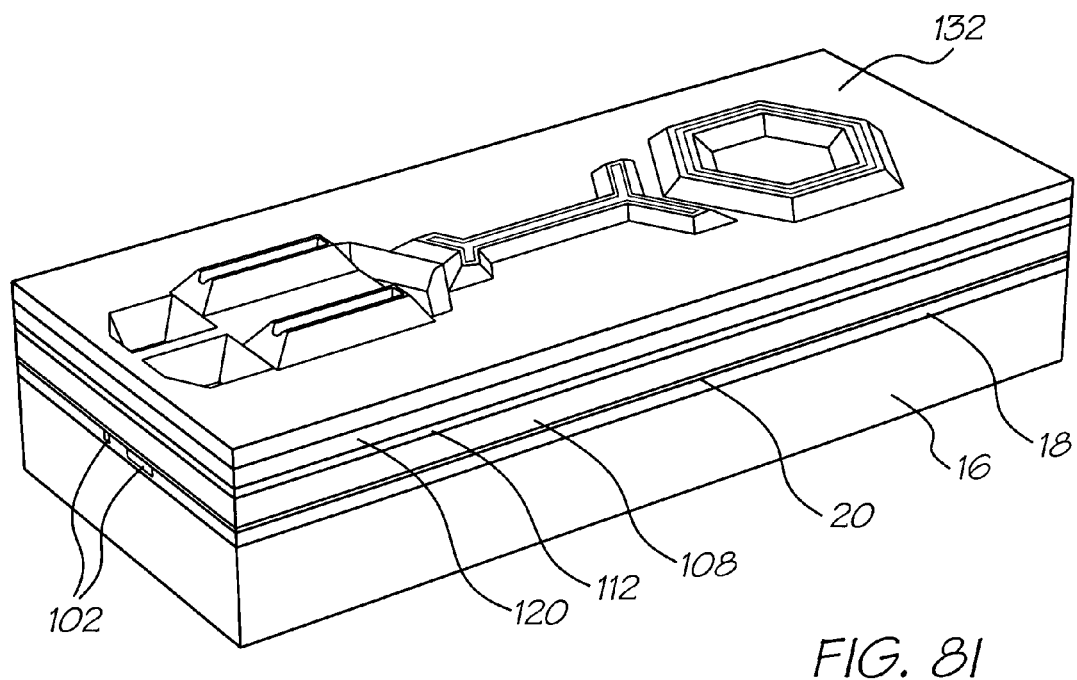
Figure 91:
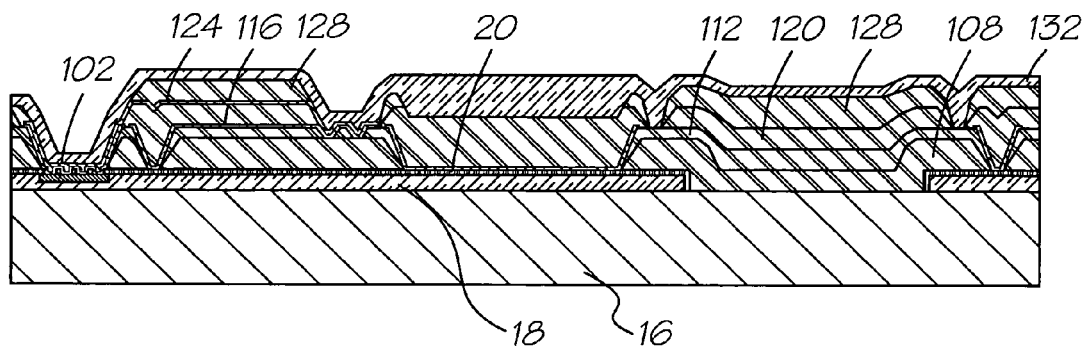
Figure 9M:
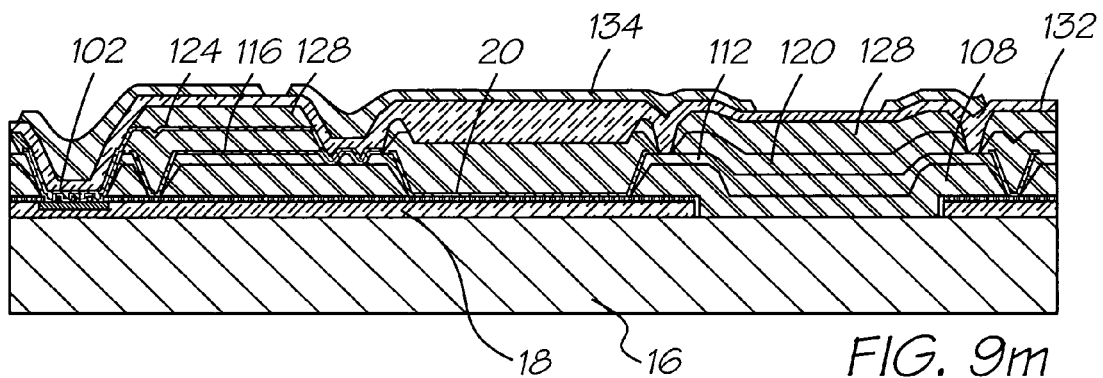
Figure 10J:
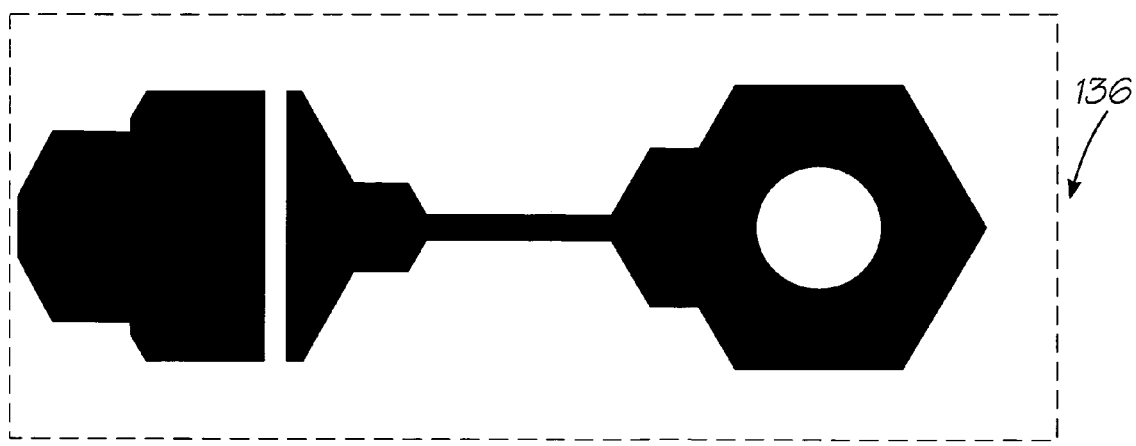
Figure 9N:
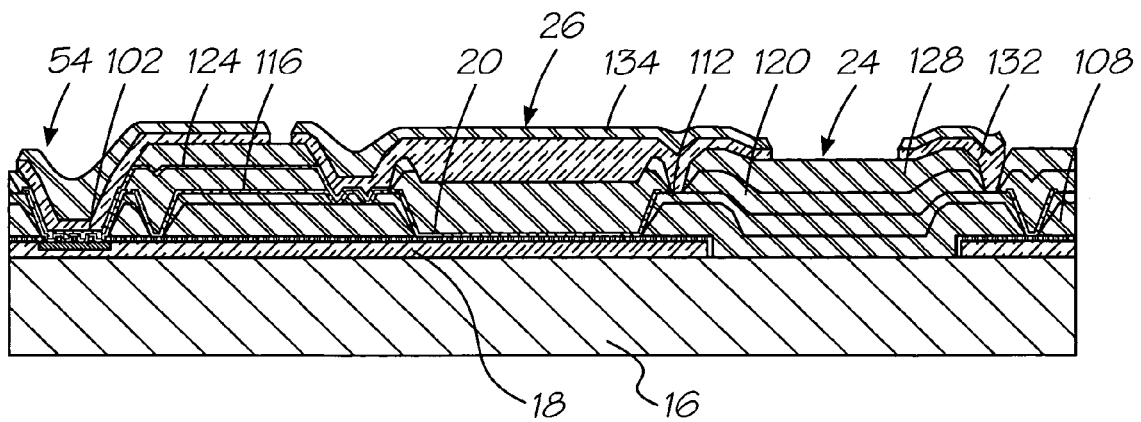
Figure 9O:
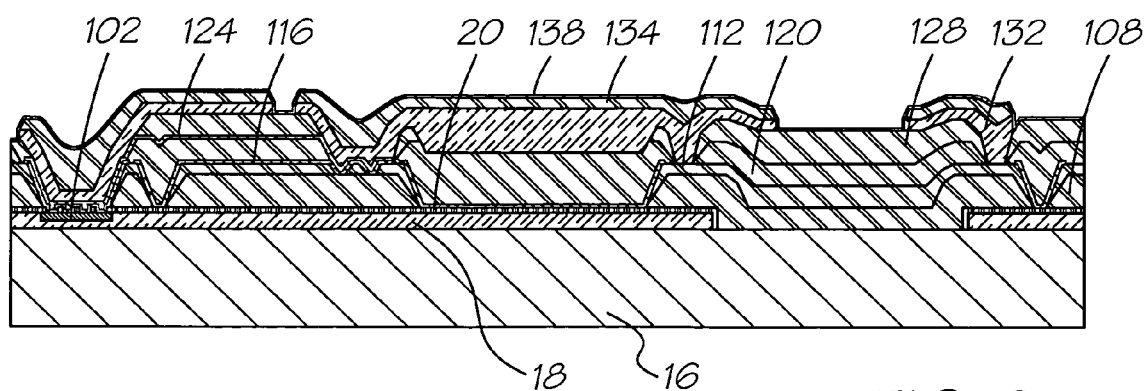

A fourth sacrificial layer 128 is applied by spinning on 4 μm of photosensitive polyimide or approximately 2.6 μm of high temperature resist. The layer 128 is softbaked, exposed to the mask 130 and is then developed to leave the island portions as shown in FIG. 9k of the drawings. The remaining portions of the layer 128 are hardbaked at 400° C. for approximately one hour in the case of polyimide or at greater than 300° C. for resist.

As shown in FIG. 8l of the drawing a high Young's modulus dielectric layer 132 is deposited. The layer 132 is constituted by approximately 1 μm of silicon nitride or aluminum oxide. The layer 132 is deposited at a temperature below the hardbaked temperature of the sacrificial layers 108, 112, 120, 128. The primary characteristics required for this dielectric layer 132 are a high elastic modulus, chemical inertness and good adhesion to TiN.

A fifth sacrificial layer 134 is applied by spinning on 2 μm of photosensitive polyimide or approximately 1.3 μm of high temperature resist. The layer 134 is softbaked, exposed to mask 136 and developed. The remaining portion of the layer 134 is then hardbaked at 400° C. for one hour in the case of the polyimide or at greater than 300° C. for the resist.

The dielectric layer 132 is plasma etched down to the sacrificial layer 128 taking care not to remove any of the sacrificial layer 134.

This step defines the nozzle opening 24, the lever arm 26 and the anchor 54 of the nozzle assembly 10.

A high Young's modulus dielectric layer 138 is deposited. This layer 138 is formed by depositing 0.2 μm of silicon nitride or aluminum nitride at a temperature below the hardbaked temperature of the sacrificial layers 108, 112, 120 and 128.

Figure 8M:
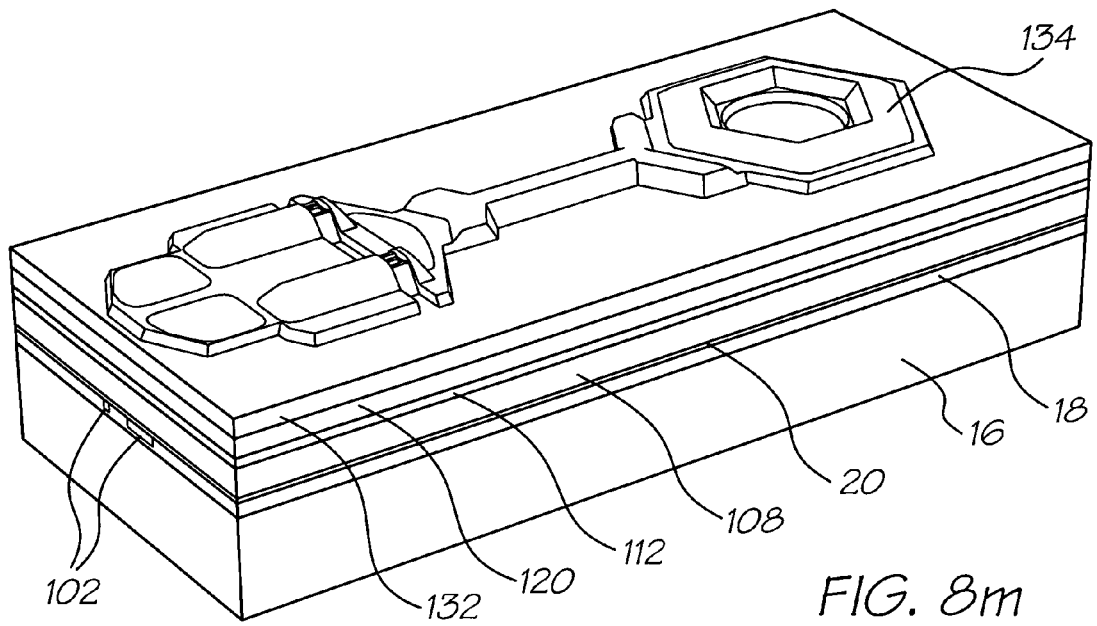
Figure 8N:
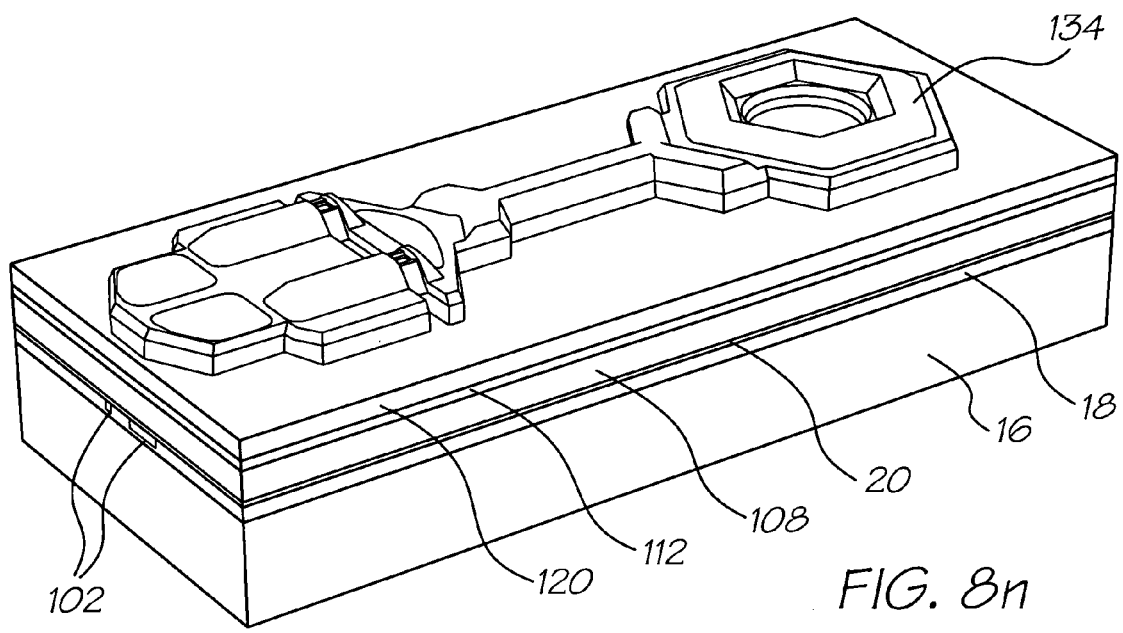
Figure 8O:
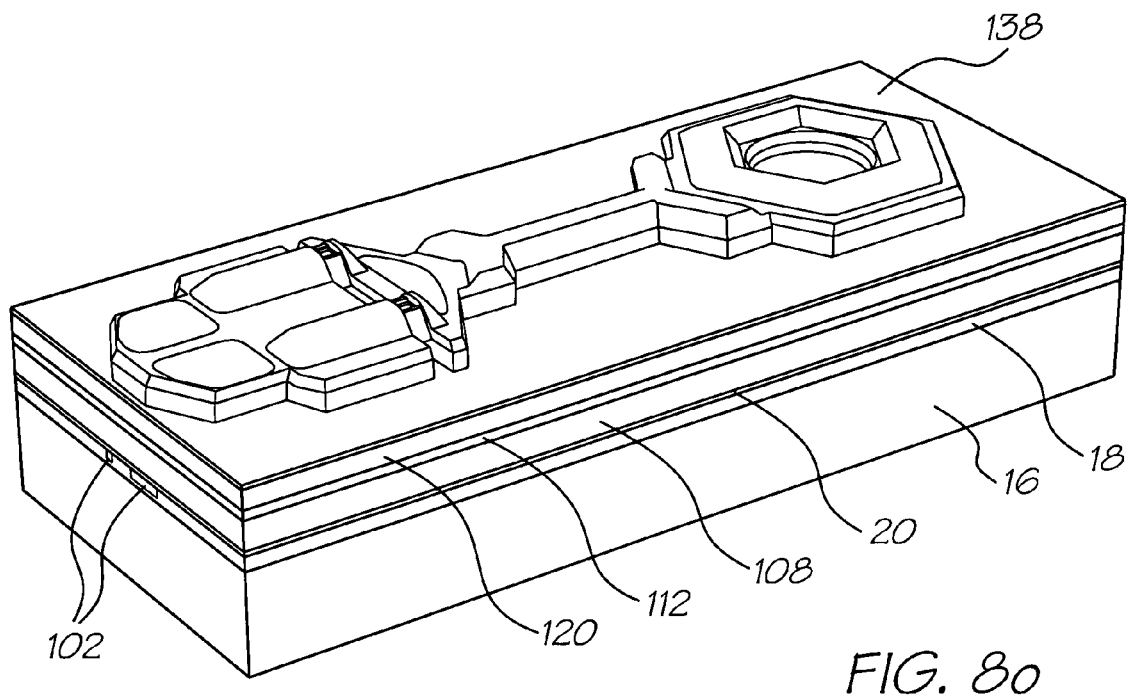
Figure 8P:
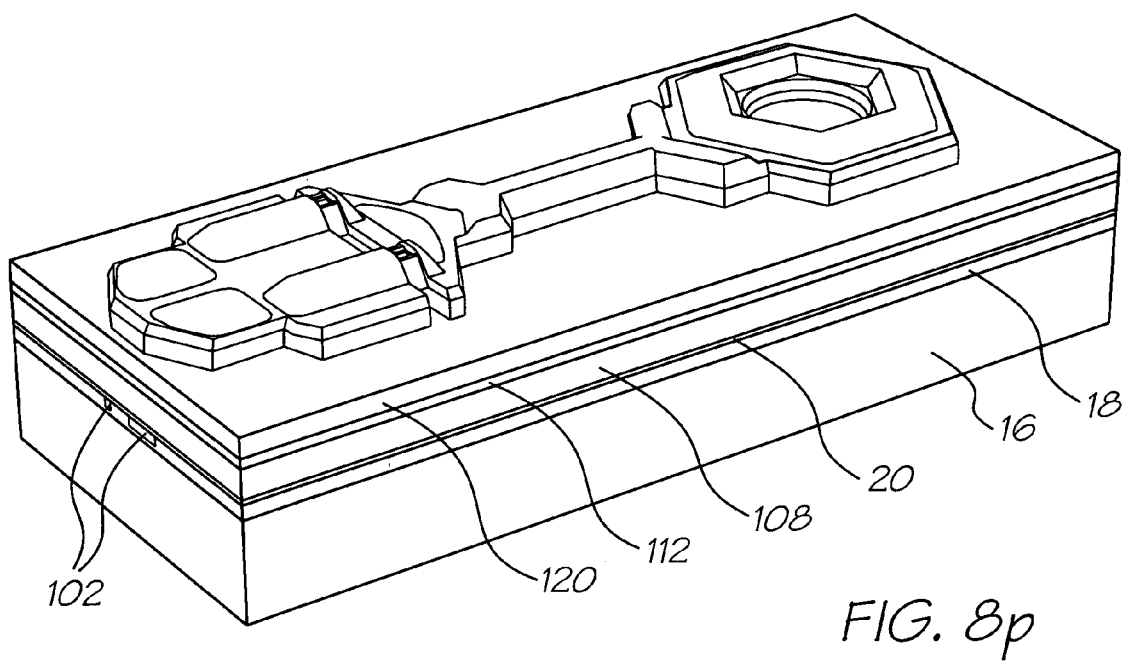
Figure 9P:
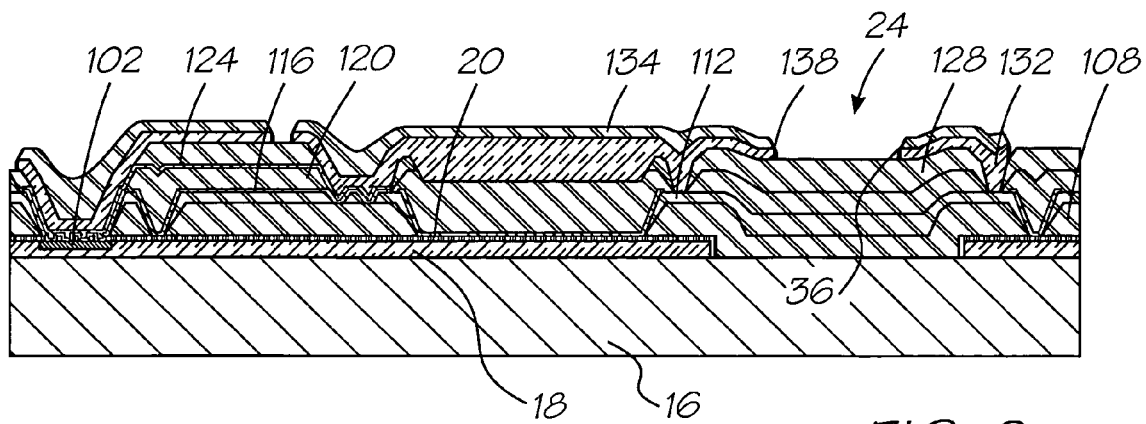
Figure 8Q:
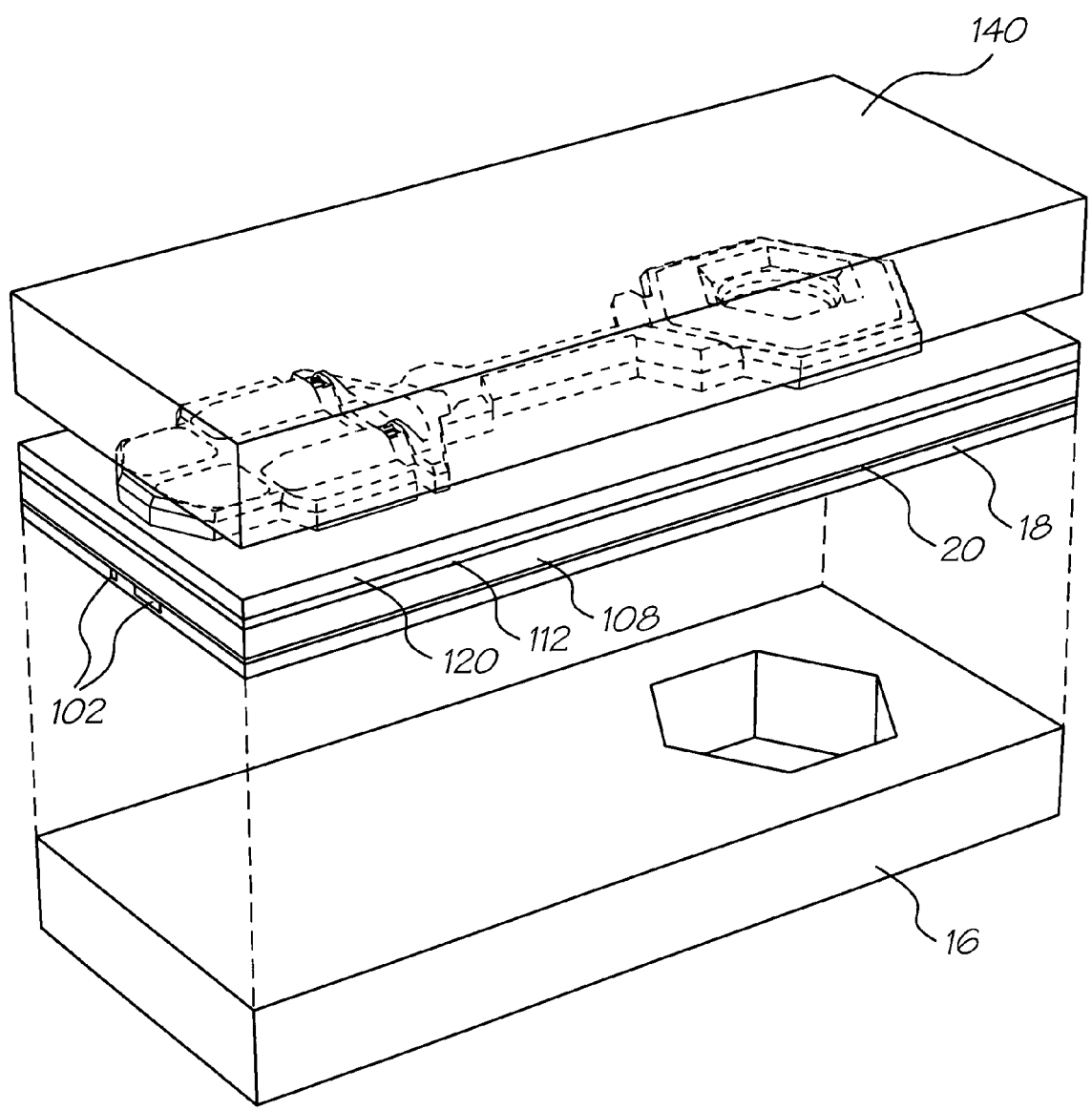
Figure 9Q:
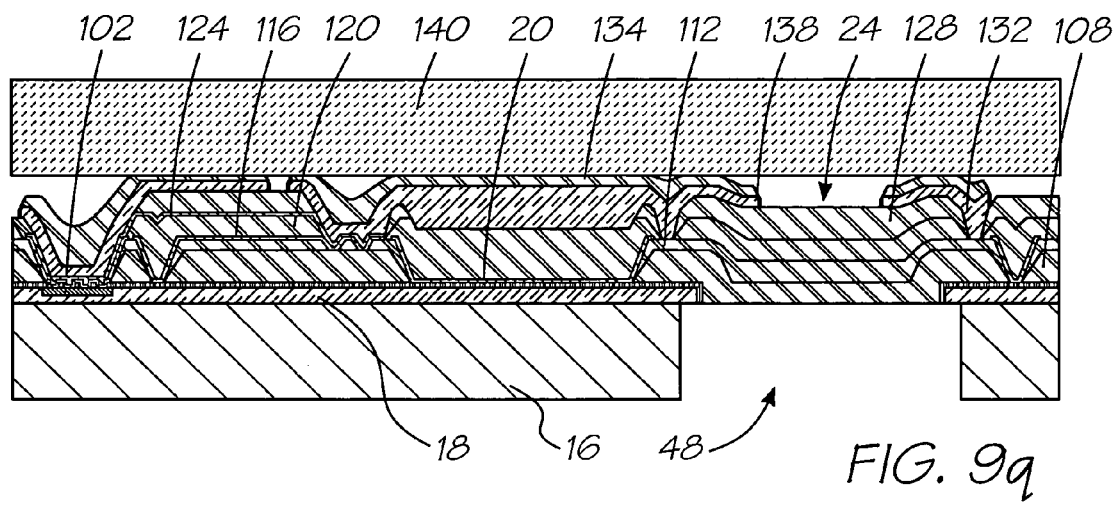
Figure 10K:
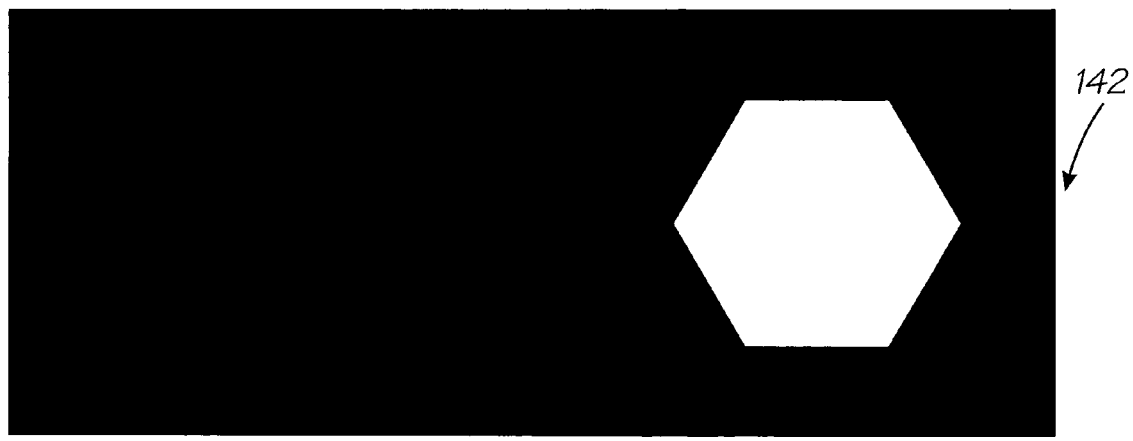

Then, as shown in FIG. 8p of the drawings, the layer 138 is anisotropically plasma etched to a depth of 0.35 microns. This etch is intended to clear the dielectric from the entire surface except the side walls of the dielectric layer 132 and the sacrificial layer 134. This step creates the nozzle rim 36 around the nozzle opening 24 which "pins" the meniscus of ink, as described above.

An ultraviolet (UV) release tape 140 is applied. 4 μm of resist is spun on to a rear of the silicon wafer substrate 16. The wafer substrate 16 is exposed to mask 142 to back etch the wafer substrate 16 to define the ink inlet channel 48. The resist is then stripped from the wafer 16.

Figure 8R:
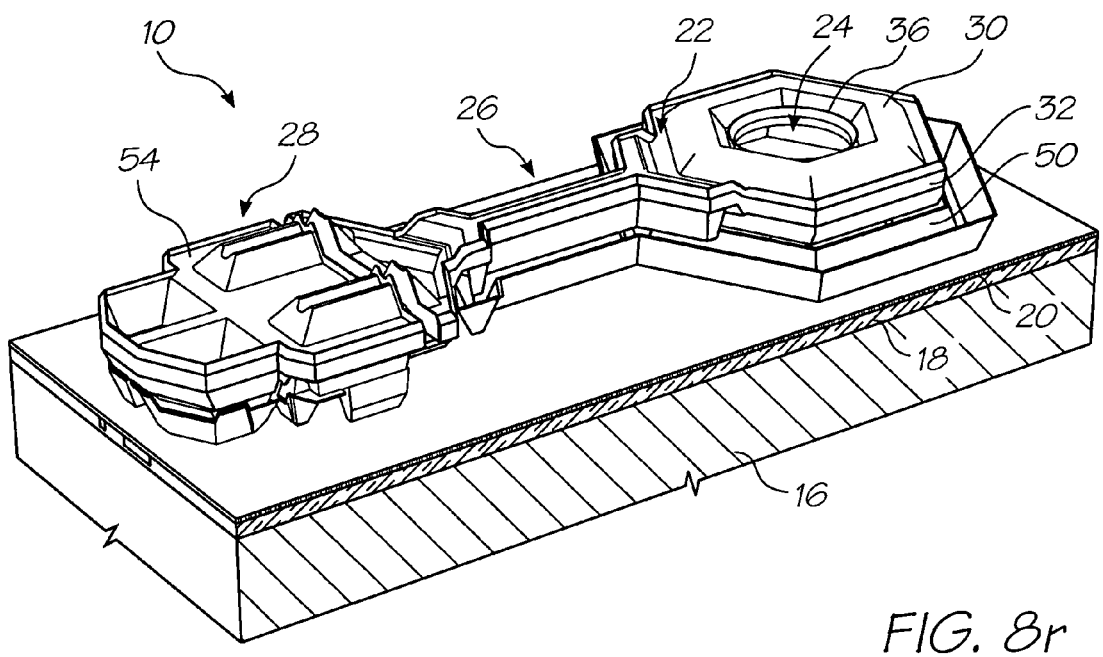
Figure 9R:
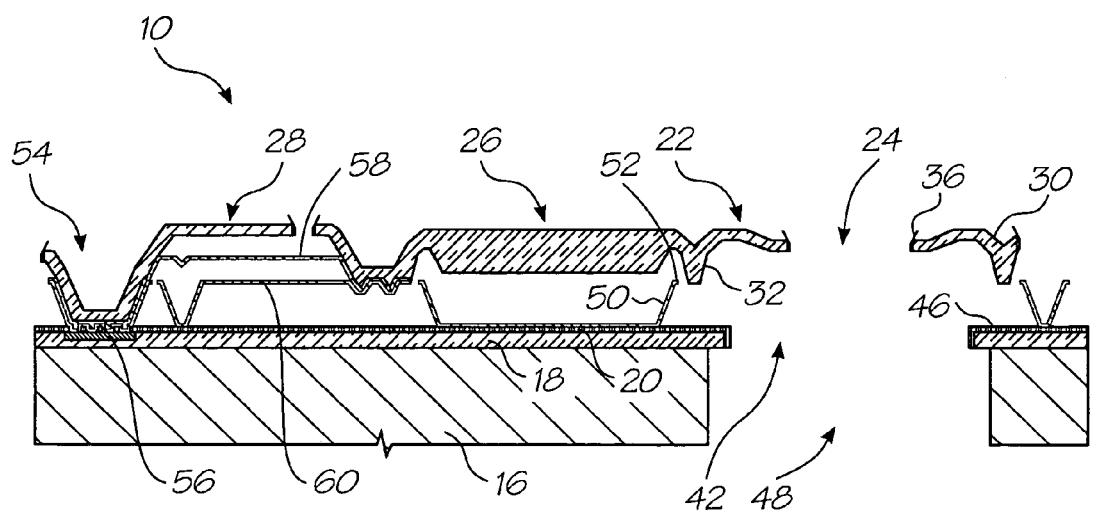
Figure 11A:
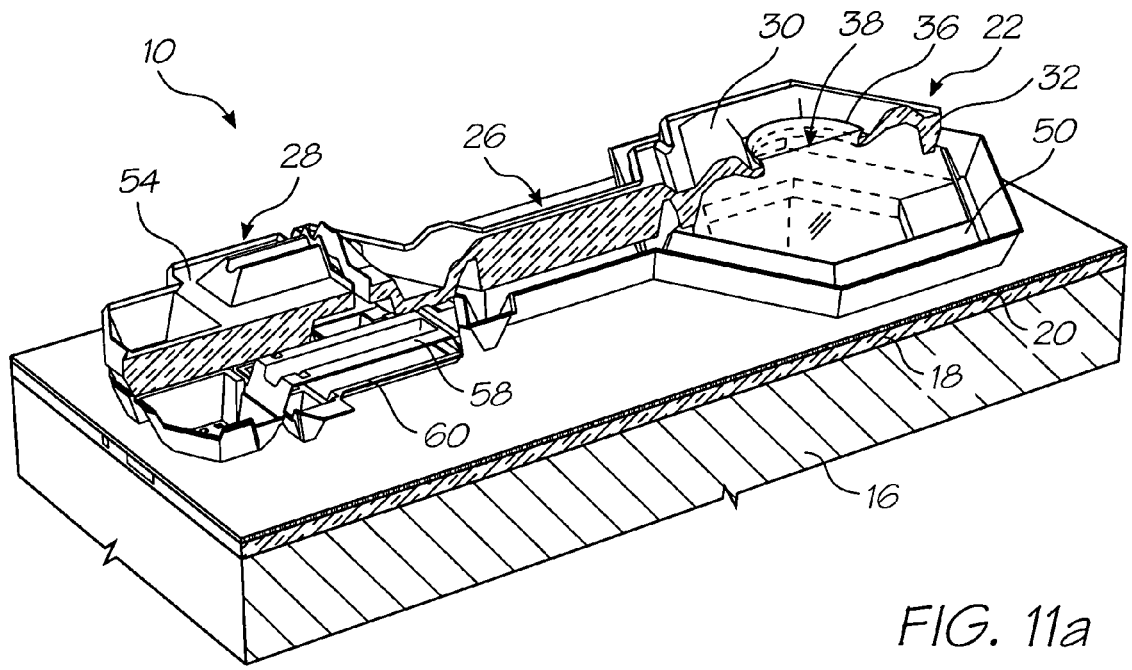
FIGS. 11a to 11c show three dimensional views of an operation of the nozzle assembly manufactured according to the method of FIGS. 8 and 9.
Figure 12A:
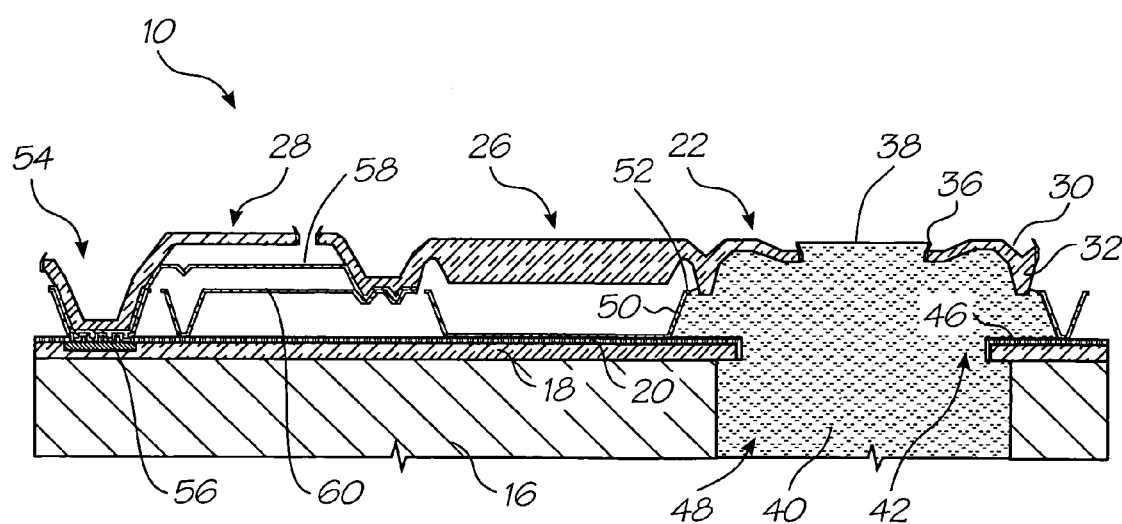
FIGS. 12a to 12c show sectional side views of an operation of the nozzle assembly manufactured according to the method of FIGS. 8 and 9.
Figure 11B:
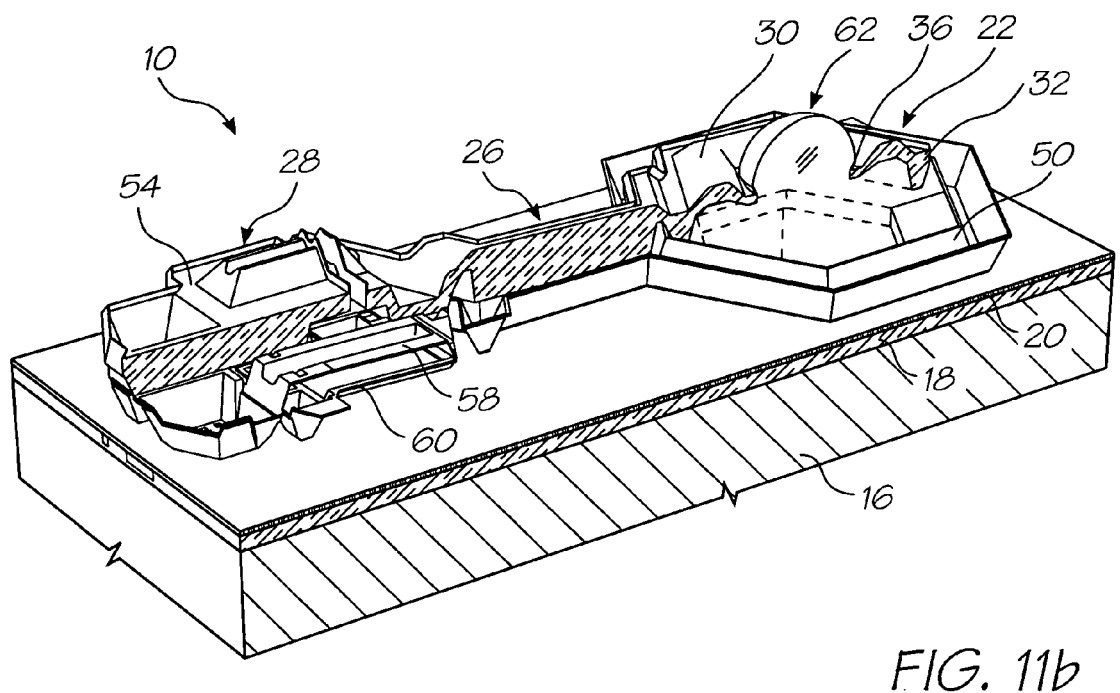
Figure 12B:
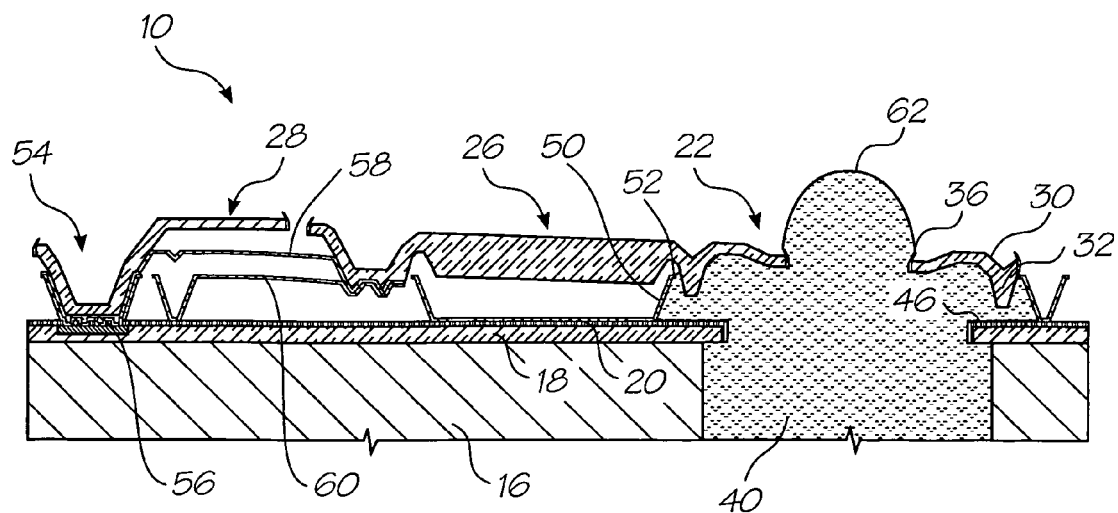
Figure 11C:
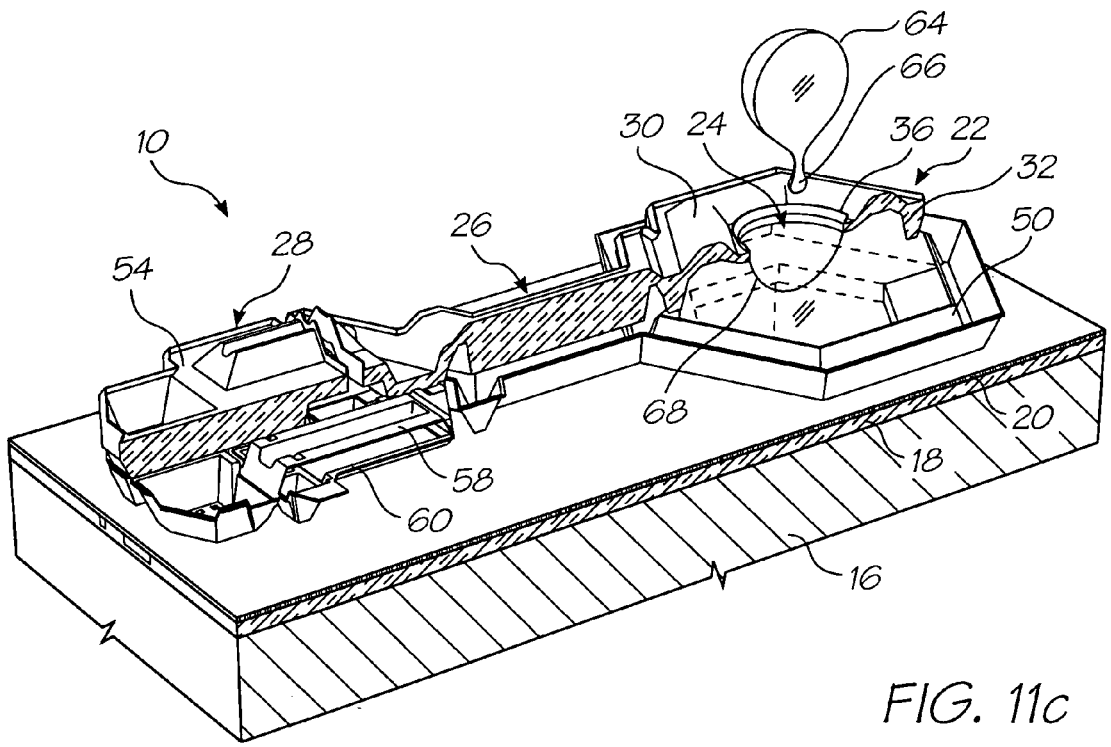
Figure 12C:
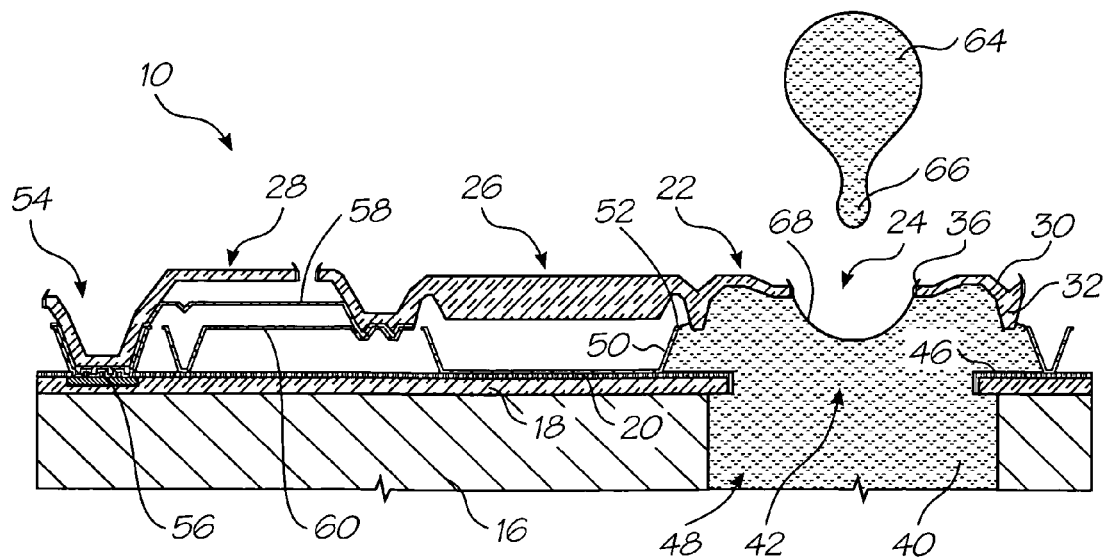

A further UV release tape (not shown) is applied to a rear of the wafer substrate 16 and the tape 140 is removed. The sacrificial layers 108, 112, 120, 128 and 134 are stripped in oxygen plasma to provide the final nozzle assembly 10 as shown in FIGS. 8r and 9r of the drawings. For ease of reference, the reference numerals illustrated in these two drawings are the same as those in FIG. 1 of the drawings to indicate the relevant parts of the nozzle assembly 10. FIGS. 11 and 12 show the operation of the nozzle assembly 10, manufactured in accordance with the process described above with reference to FIGS. 8 and 9 and these figures correspond to FIGS. 2 to 4 of the drawings.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A liquid-ejection integrated circuit which comprises
a substrate that defines a plurality of liquid inlet channels;
drive circuitry positioned on the substrate;
a plurality of nozzle chamber structures positioned on the substrate and defining nozzle chambers in fluid communication with respective liquid inlet channels and liquid ejection ports in fluid communication with respective nozzle chambers, each nozzle chamber structure incorporating a liquid ejection member displaceable with respect to the substrate to eject liquid from the respective liquid ejection port;
a plurality of micro-electromechanical actuators connected to the drive circuitry to receive drive signals from the drive circuitry and operable on respective liquid ejection members;
a nozzle guard that is positioned on the substrate and that defines a plurality of apertures in alignment with respective liquid ejection ports; and
a plurality of containment walls interposed between the substrate and the nozzle guard to define a plurality of containment chambers with at least one nozzle chamber structure and associated actuator being positioned in each containment chamber.

2. A liquid-ejection integrated circuit as claimed in claim 1, in which the containment walls are configured so that one nozzle chamber structure and associated actuator are positioned in each containment chamber.

3. A liquid-ejection integrated circuit device as claimed in claim 1, in which each nozzle chamber structure includes a nozzle chamber wall that bounds the respective inlet channel, the liquid ejection member being shaped to overlie the nozzle chamber wall so that the nozzle chamber wall and the liquid ejection member together define the nozzle chamber, the liquid ejection member defining the liquid ejection port.

4. A liquid-ejection integrated circuit device as claimed in claim 3, in which each movable member includes a crown portion that defines the liquid ejection port and a skirt portion that depends from the crown portion to overlap the nozzle chamber wall.

5. A liquid-ejection integrated circuit device as claimed in claim 4, in which each movable member and its associated nozzle chamber wall are shaped so that when the nozzle chamber is filled with liquid, a meniscus is formed between the nozzle chamber wall and the skirt portion to define a fluidic seal to inhibit the egress of liquid during operation of the integrated circuit device.

6. A liquid-ejection integrated circuit device as claimed in claim 1, in which each micro-electromechanical actuator is elongate, with one end fast with the substrate and the other end fast with a respective movable member, the actuator including a first active beam and a second passive beam interposed between the active beam and the substrate, the first active beam defining a heating circuit to experience thermal expansion when heated by a current from the drive circuitry while the passive beam is substantially unheated so that the actuator undergoes differential thermal expansion and contraction causing said other end to move towards the substrate.

7. A liquid-ejection integrated circuit as claimed in claim 1, in which the nozzle guard, the containment walls and the substrate are of materials that have the same coefficient of thermal expansion.

* * * * *

UNITED STATES PATENT AND TRADEMARK OFFICE
CERTIFICATE OF CORRECTION

PATENT NO.        : 7,232,203 B2                                         Page 1 of 1
APPLICATION NO.   : 11/329088
DATED             : June 19, 2007
INVENTOR(S)       : Kia Silverbrook It is certified that error appears in the above-identified patent and that said Letters Patent is hereby corrected as shown below:

Title Page; should read;
(63)    Continuation of application No. 11/026,117, filed on Jan. 3, 2005, now Pat. No 6,991,321, which is a continuation of application No. 10/778,088 filed on Feb. 17, 2004, now Pat No. 6,921,154, which is a continuation of application No. 10/052,449, filed on Jan. 23, 2002, now Pat. No. 6,733,684.

Signed and Sealed this

Twelfth Day of August, 2008

JON W. DUDAS
*Director of the United States Patent and Trademark Office*